United States Patent [19]

Kanoshima

[11] Patent Number: 5,039,212
[45] Date of Patent: Aug. 13, 1991

[54] ZOOM LENS FOR VARIABLE MAGNIFICATION COPYING MACHINE

[75] Inventor: Yuichiro Kanoshima, Tokyo, Japan

[73] Assignee: Ricoh Company, Ltd., Tokyo, Japan

[21] Appl. No.: 522,114

[22] Filed: May 11, 1990

[30] Foreign Application Priority Data

May 15, 1989 [JP] Japan ................................. 1-120961

[51] Int. Cl.$^5$ ......................... G02B 15/00; G02B 9/64
[52] U.S. Cl. .................................. 359/679; 359/740; 359/756
[58] Field of Search ................ 350/425, 450, 422, 464

[56] References Cited

U.S. PATENT DOCUMENTS 4,812,021  3/1989  Harrigan ............................ 350/425
4,813,773  3/1989  Minefuji ............................ 350/425

Primary Examiner—Bruce Y. Arnold
Assistant Examiner—Rebecca D. Gass
Attorney, Agent, or Firm—Oblon, Spivak, McClelland, Maier & Neustadt

[57] ABSTRACT

A zoom lens for a variable magnification copying machine has a first lens composed of a concave lens; a second lens composed of a convex lens; a third lens composed of a meniscus concave lens and having a concave face on an object side; a diaphragm; a fourth lens composed of the same lens as the third lens and having a concave face on an image face side; a fifth lens composed of the same convex lens as the second lens; a sixth lens composed of the same concave lens as the first lens; the first to sixth group lenses being sequentially arranged from an object face toward the image face; the first to sixth lenses being symmetrically arranged around the diaphragm when the object is formed as an image on the image face at equal magnification; and a device for symmetrically moving at least the first and sixth lenses among the first to sixth lenses and the diaphragm and moving the entire lens system in the direction of an optical axis when the object is formed by changing the magnification as an image on the image face so as to continuously change the magnification while a conjugate length from the object face to the image face is constantly held at the times of equal and variable magnifications.

5 Claims, 41 Drawing Sheets

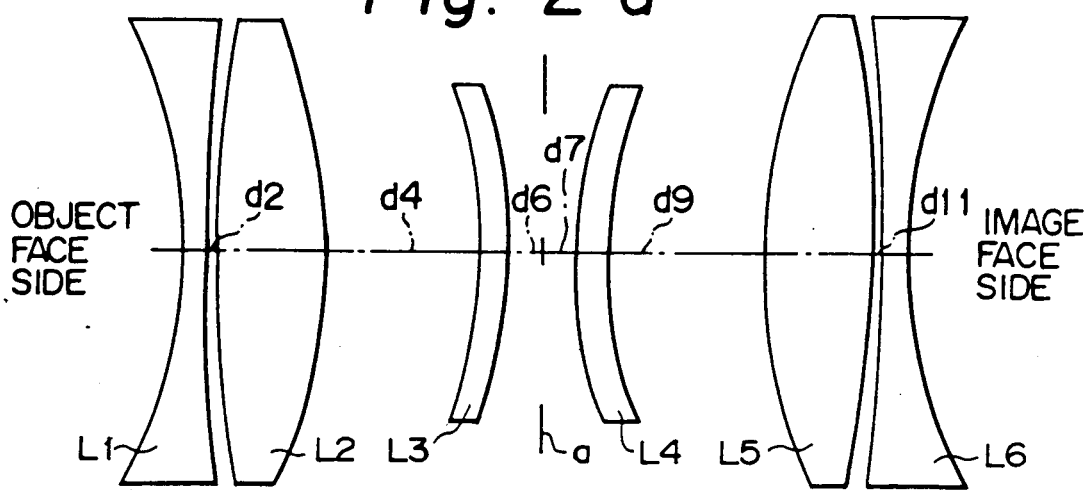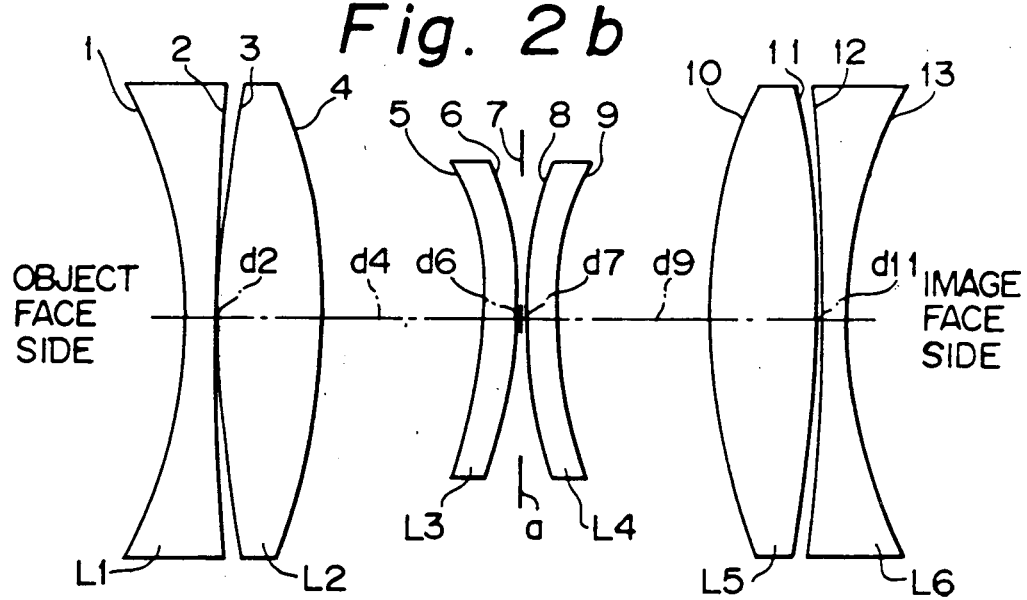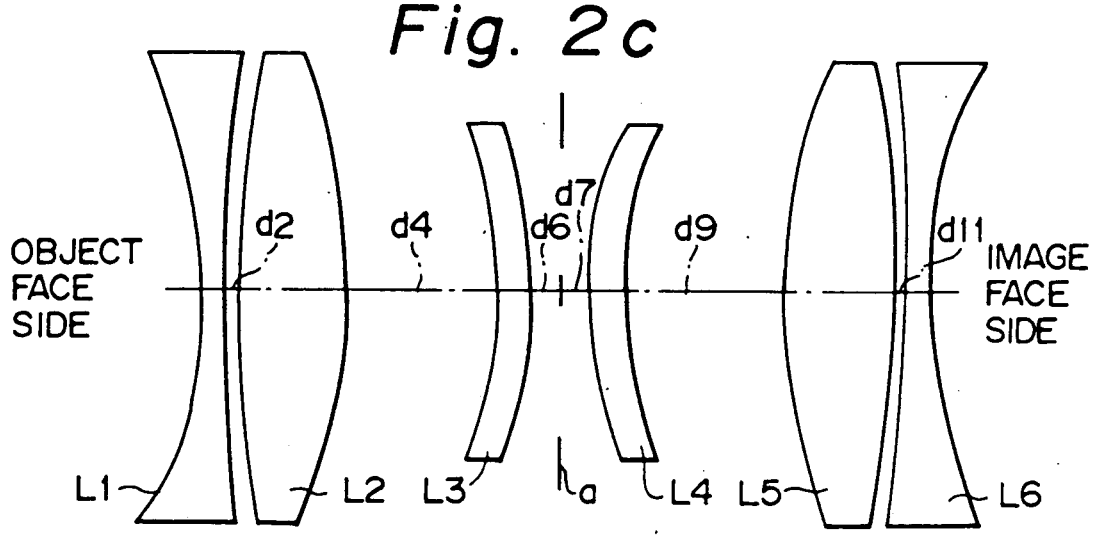

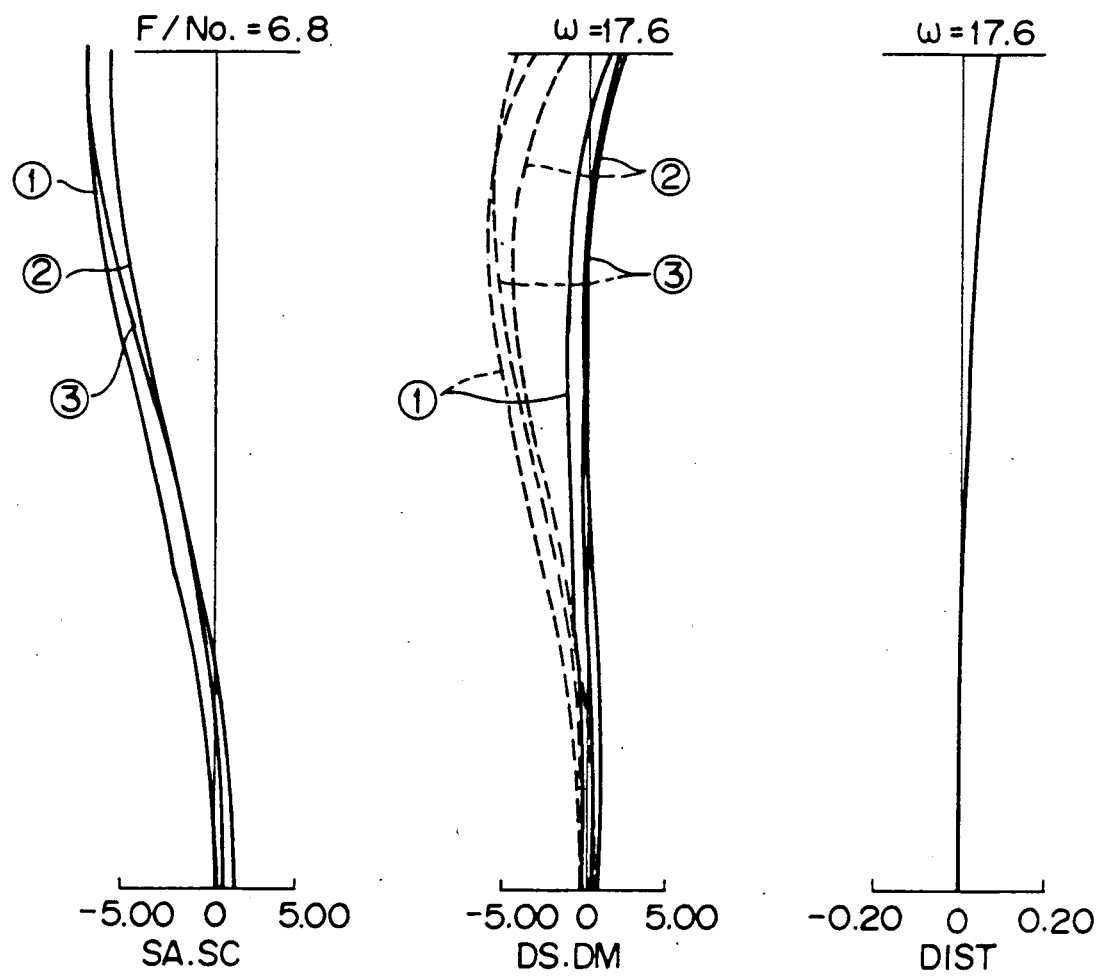

Fig. 3b1    Fig. 3b2    Fig. 3b3
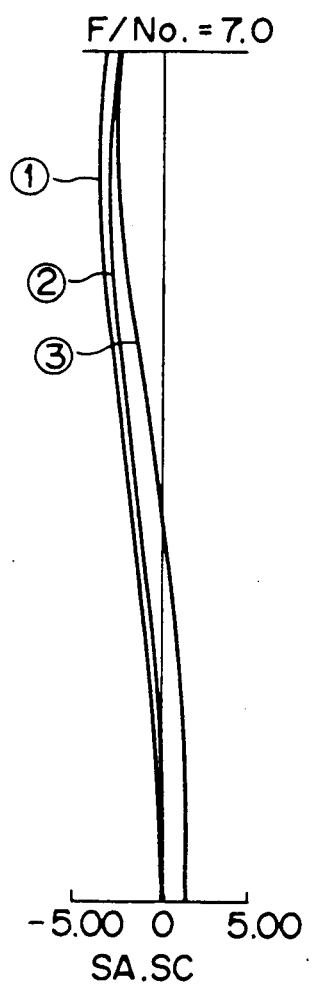
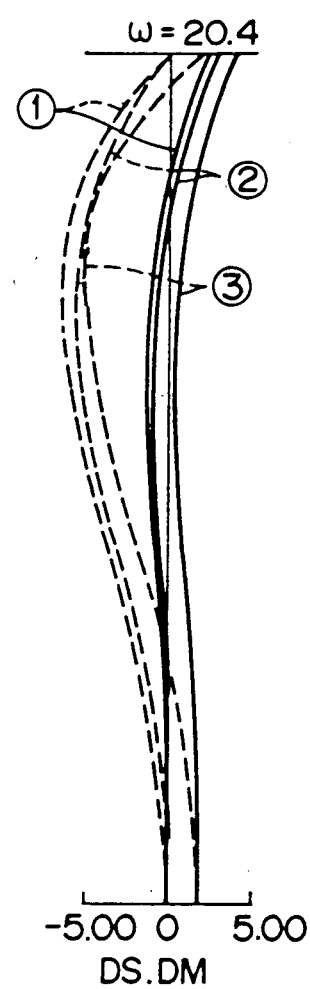
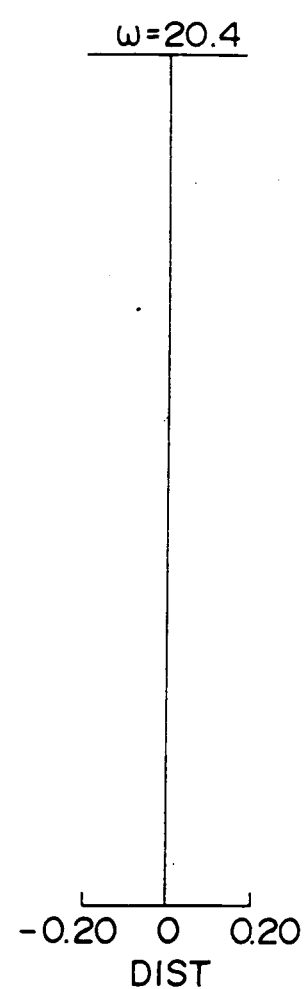

Fig. 3c1
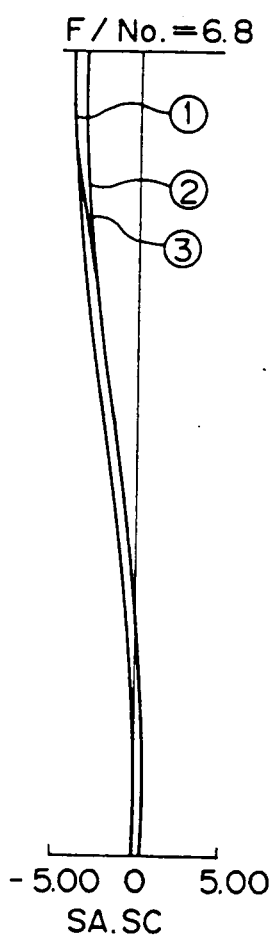
Fig. 3c2
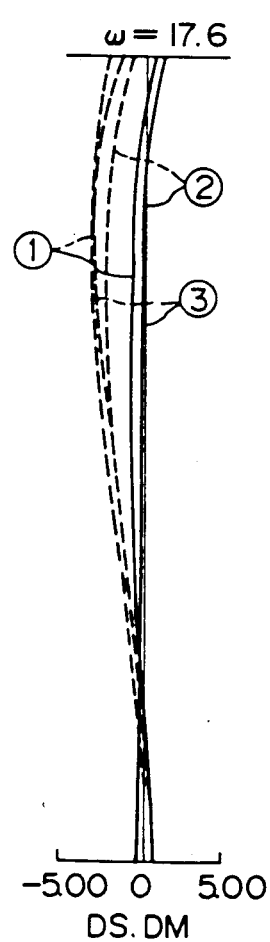
Fig. 3c3
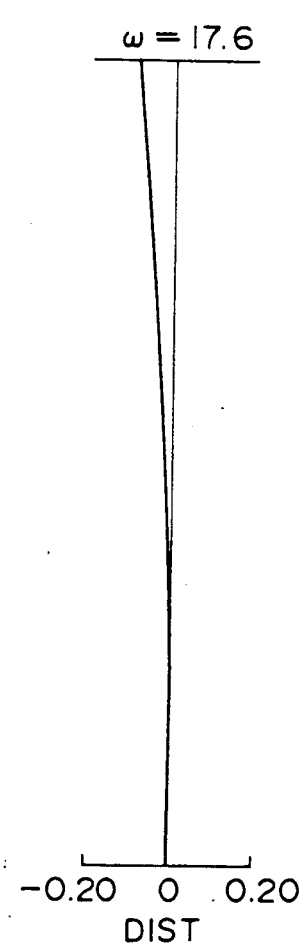

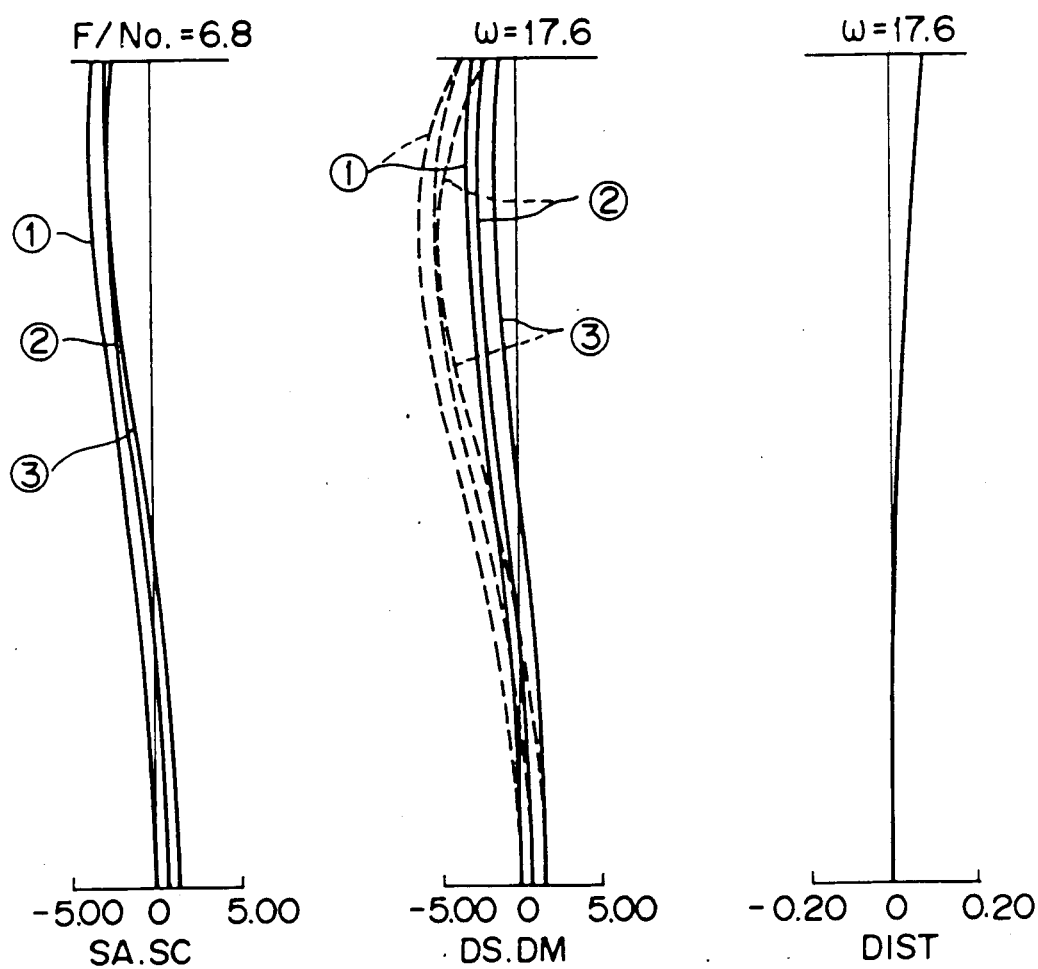

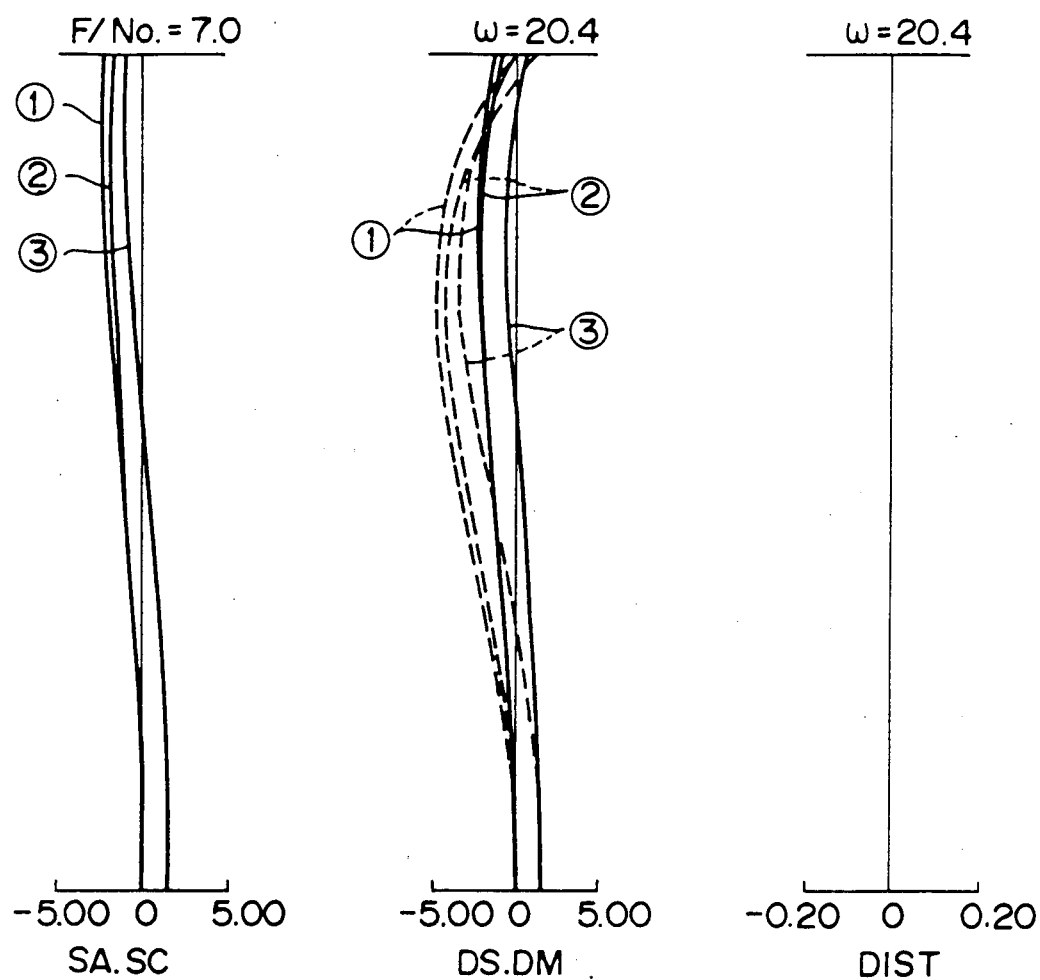

Fig. 6c1  Fig. 6c2  Fig. 6c3
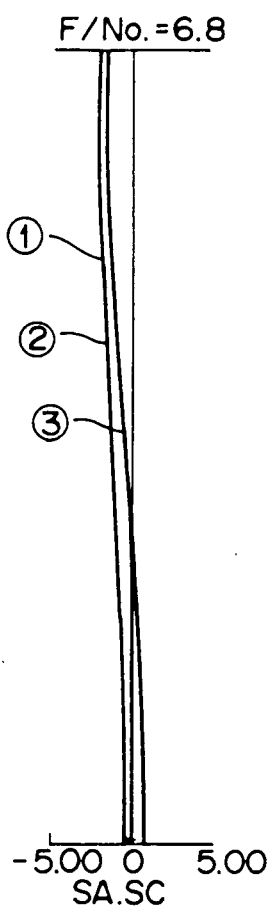
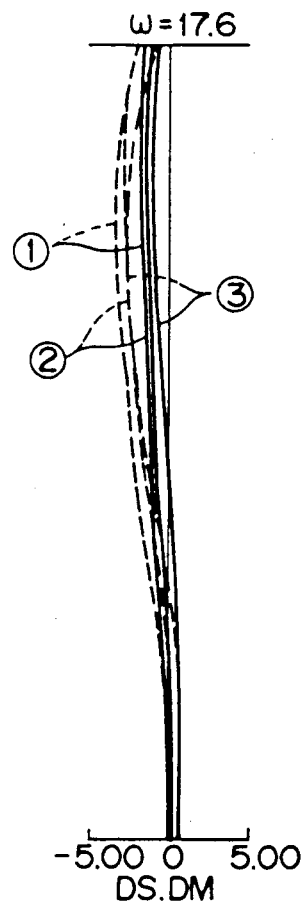
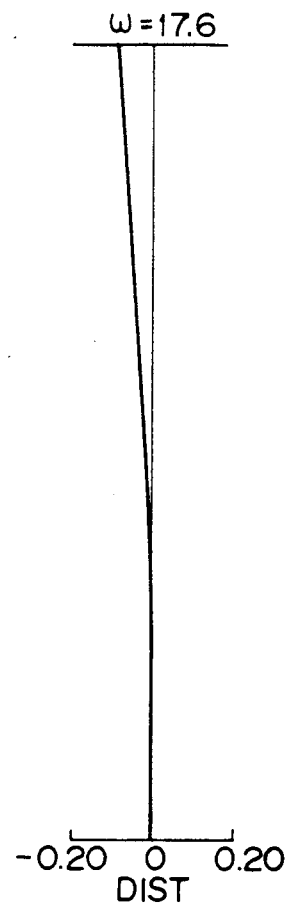

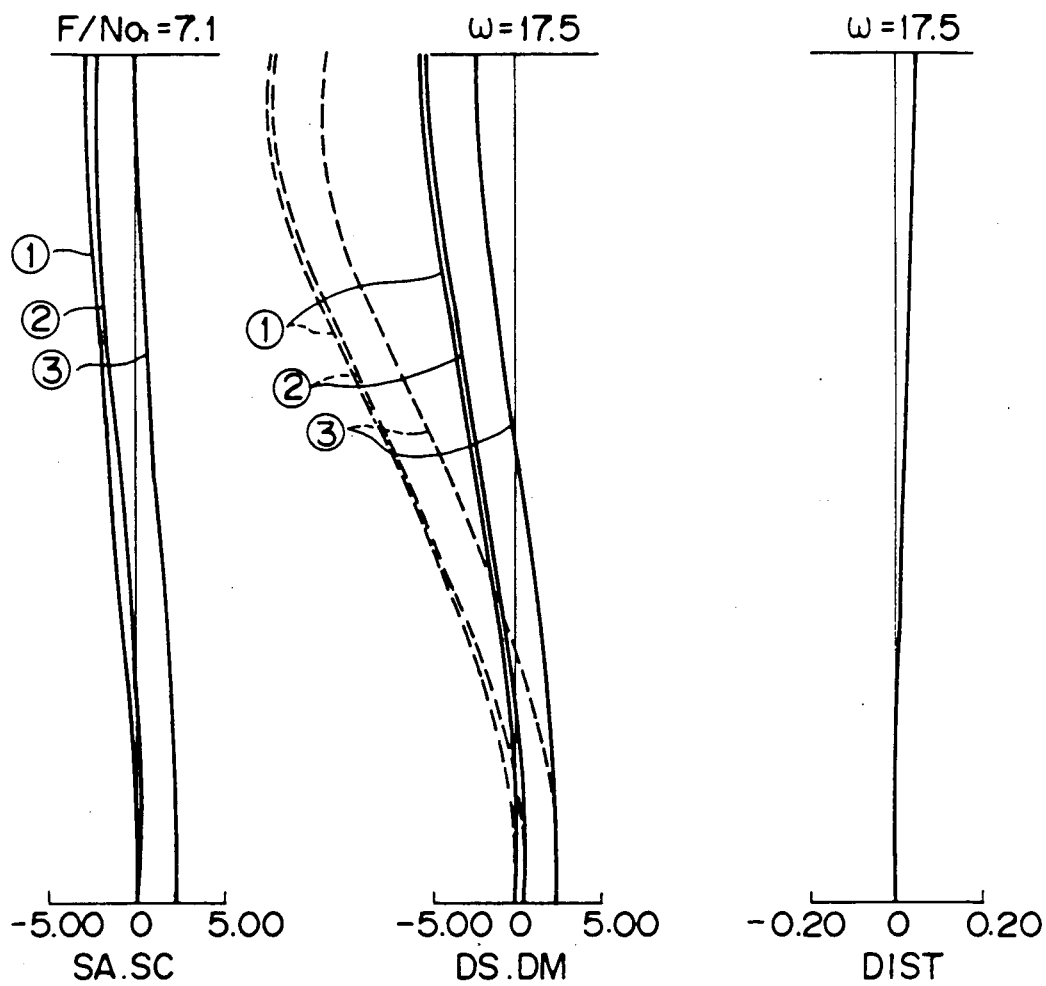

Fig. 9b1  Fig. 9b2  Fig. 9b3
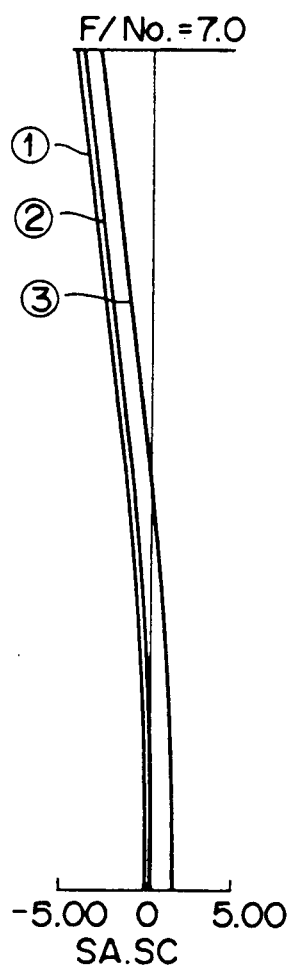
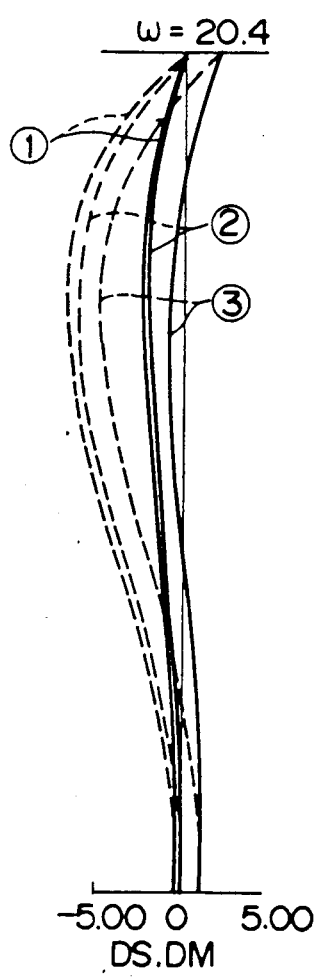
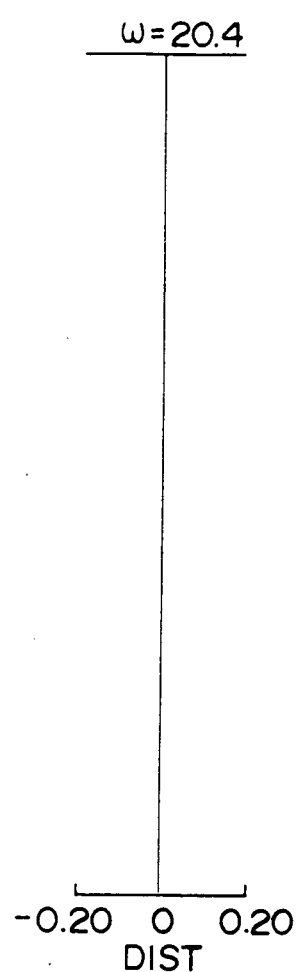

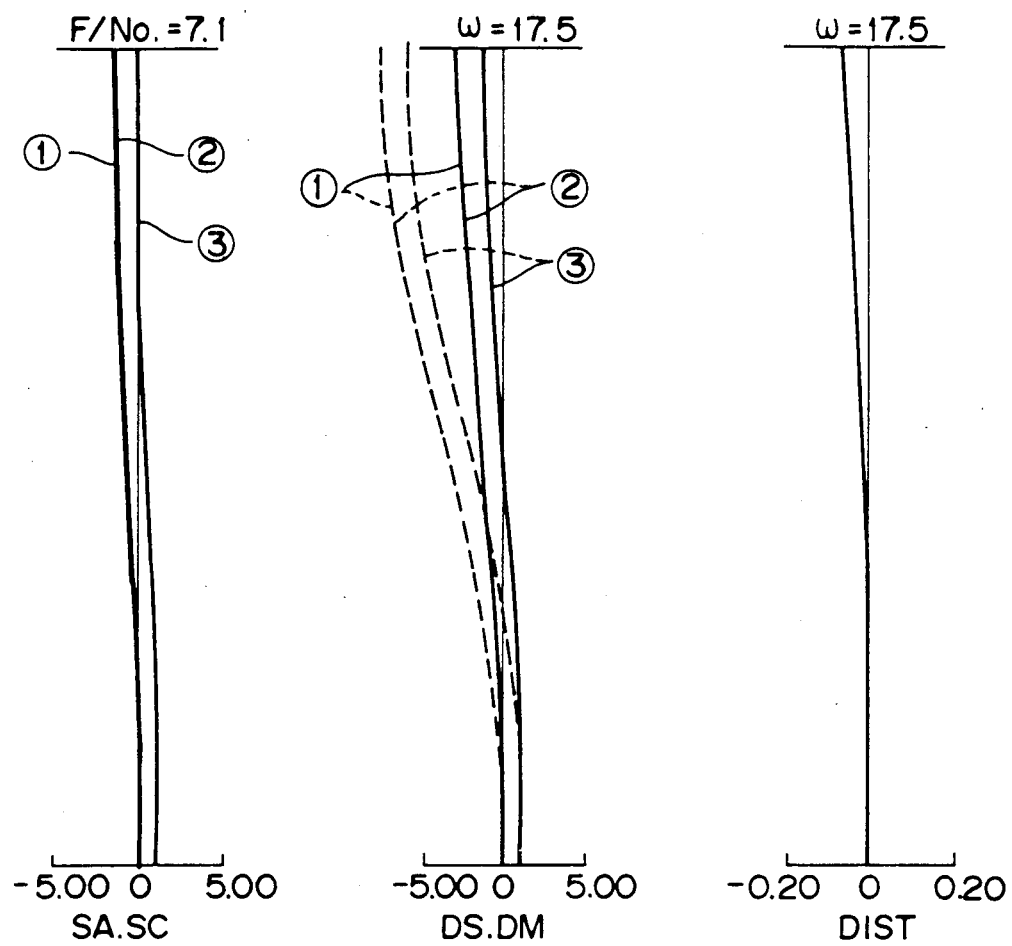
Fig. 9c1  Fig. 9c2  Fig. 9c3

Fig. 12a1  Fig. 12a2  Fig. 12a3
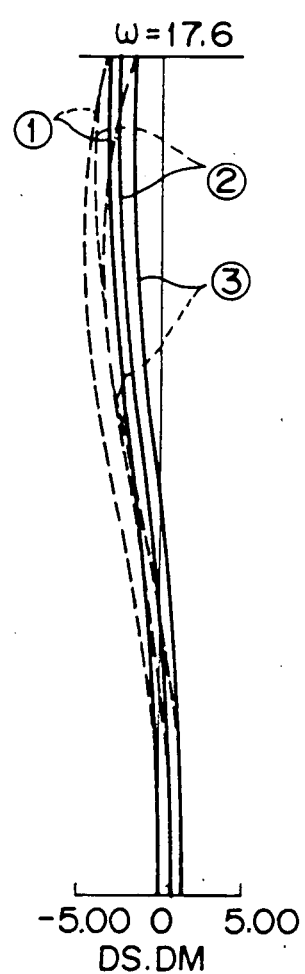
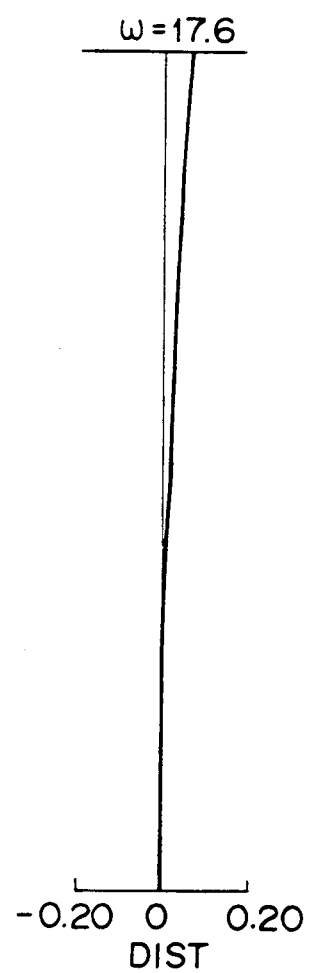

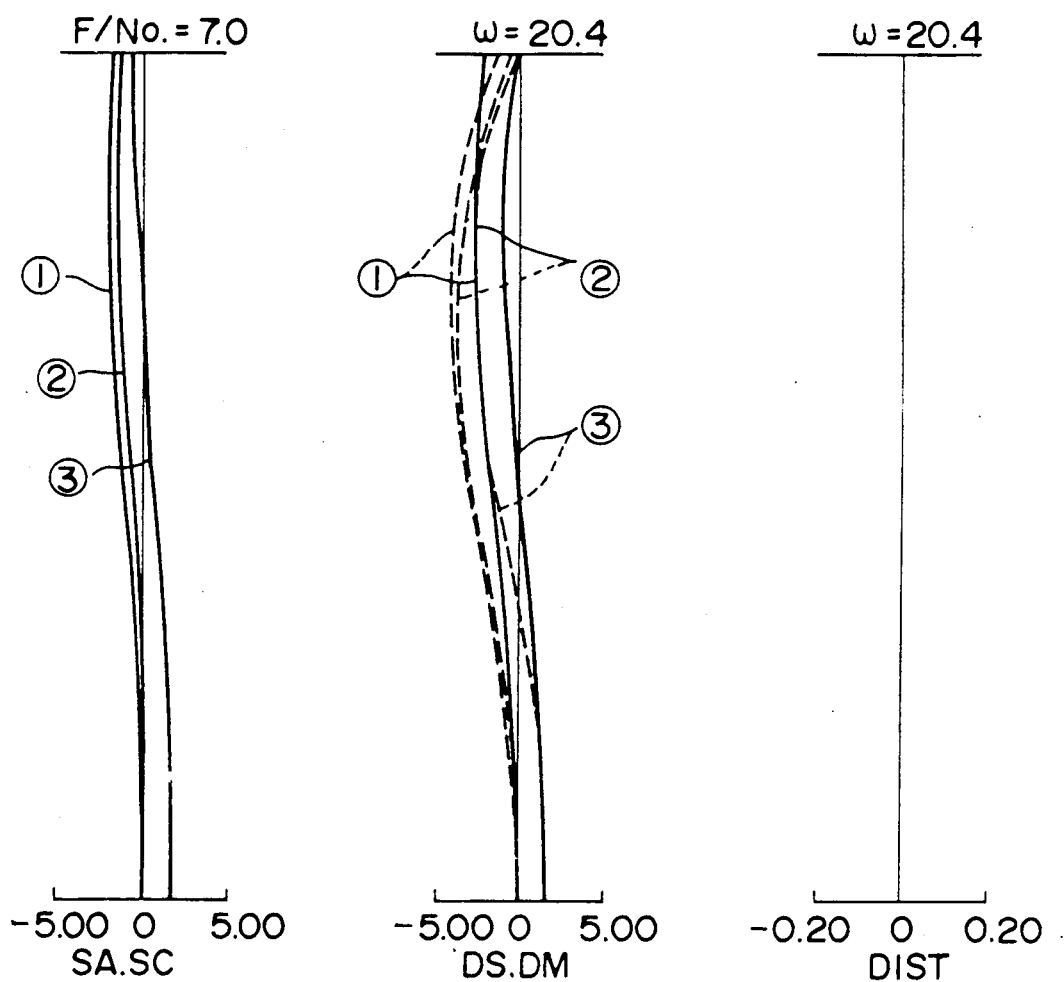
Fig. 12b1  Fig. 12b2  Fig. 12b3

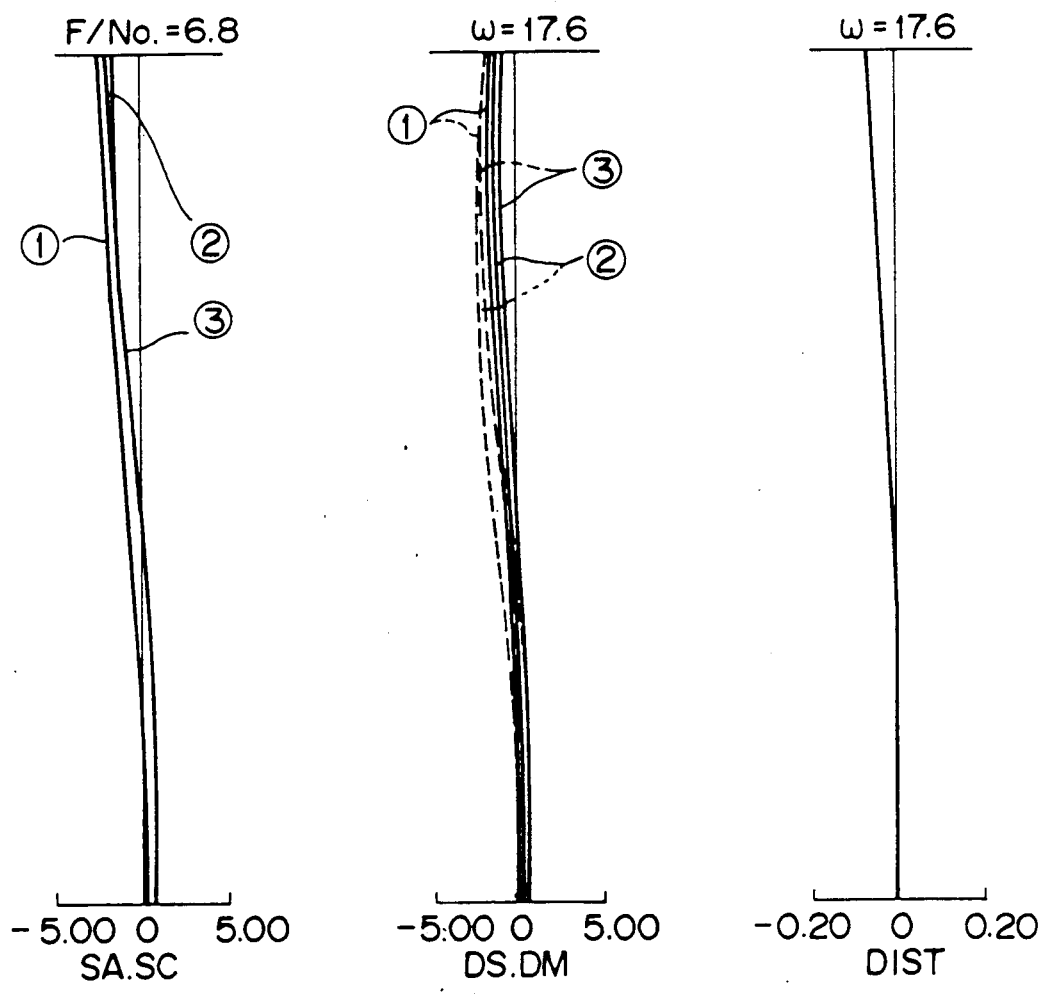

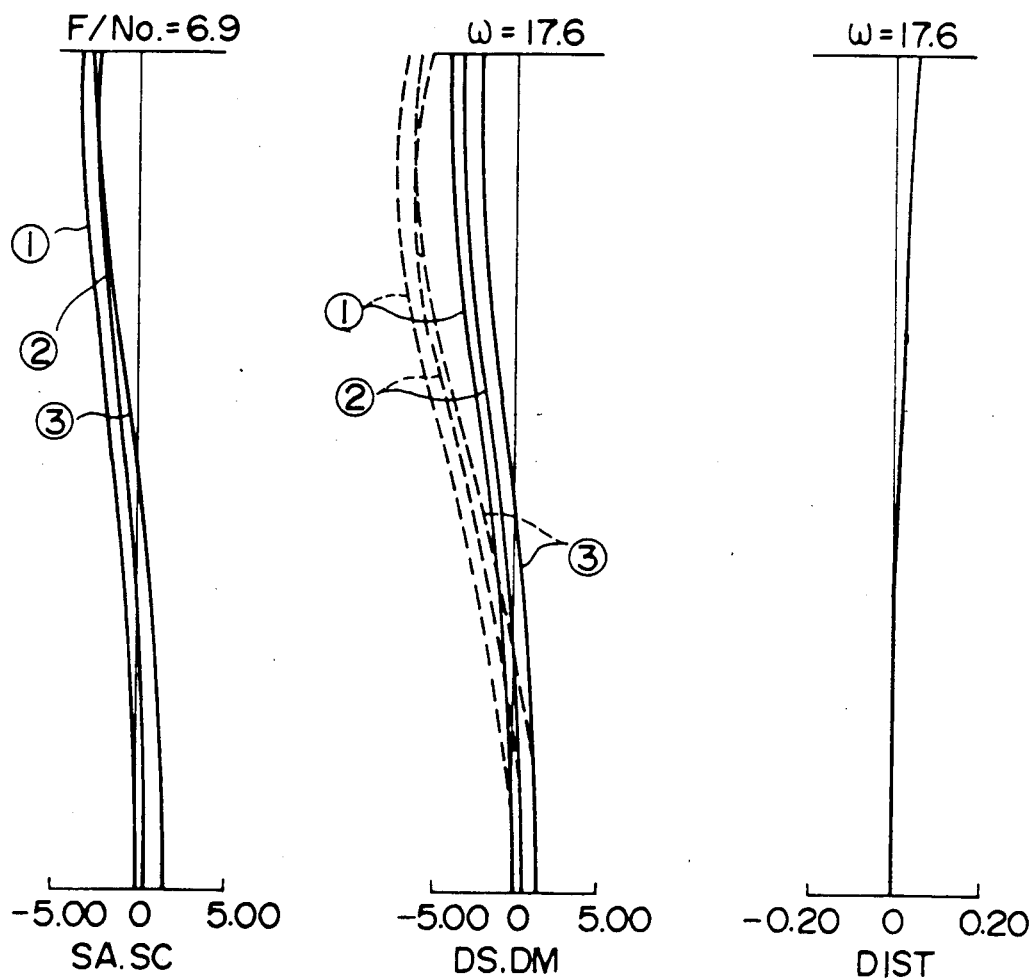

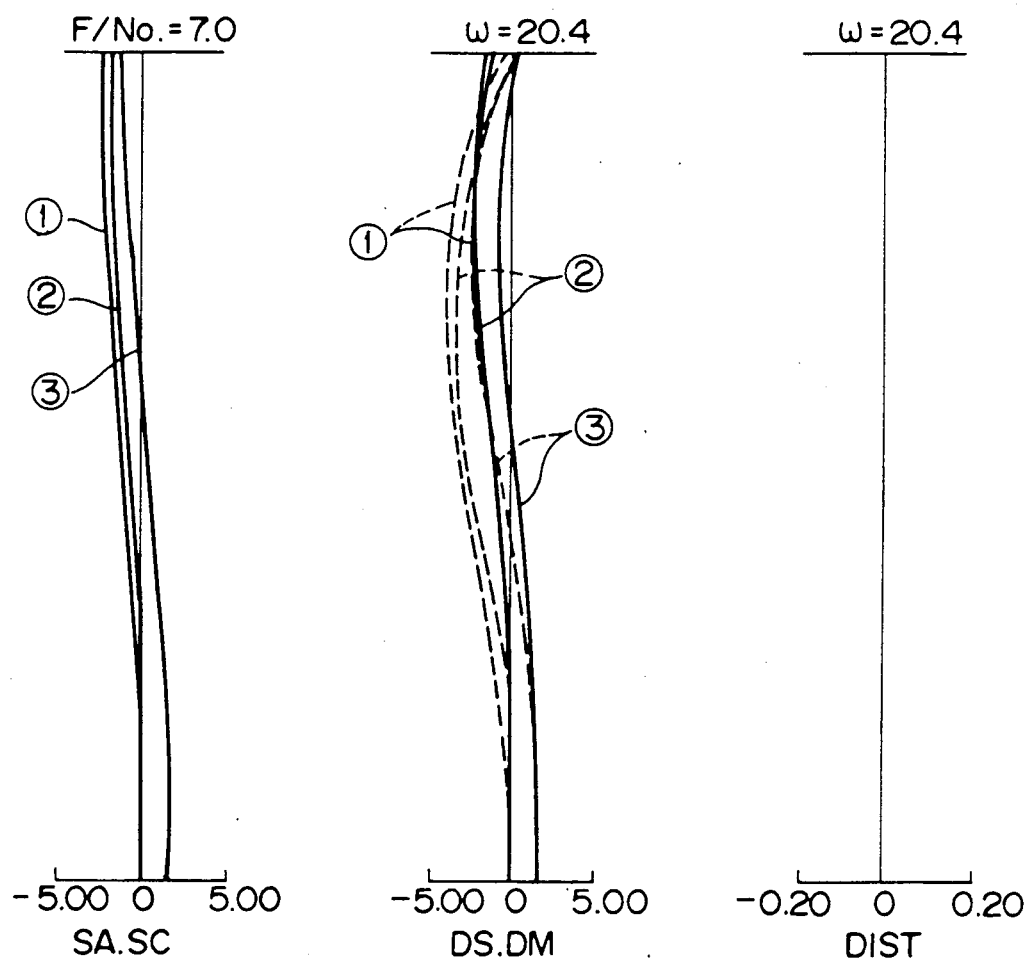
Fig. 15b1  Fig. 15b2  Fig. 15b3

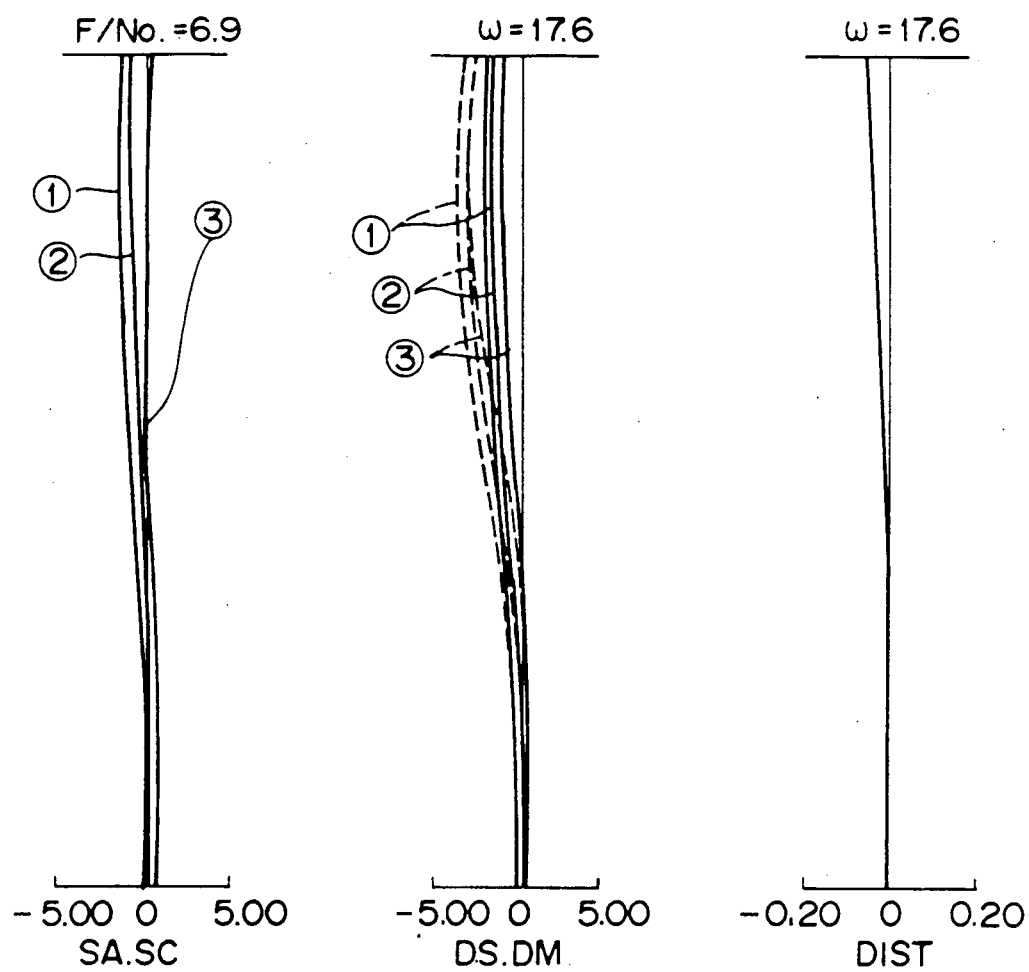

*Fig. 16a*
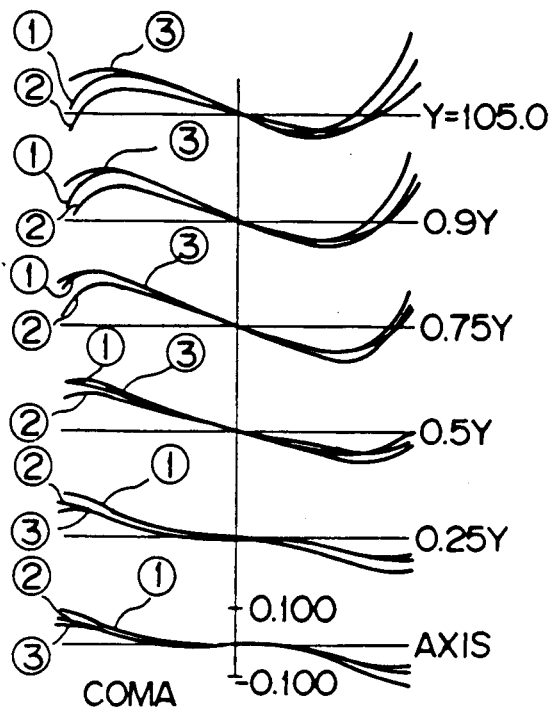
*Fig. 16b*
*Fig. 16c*
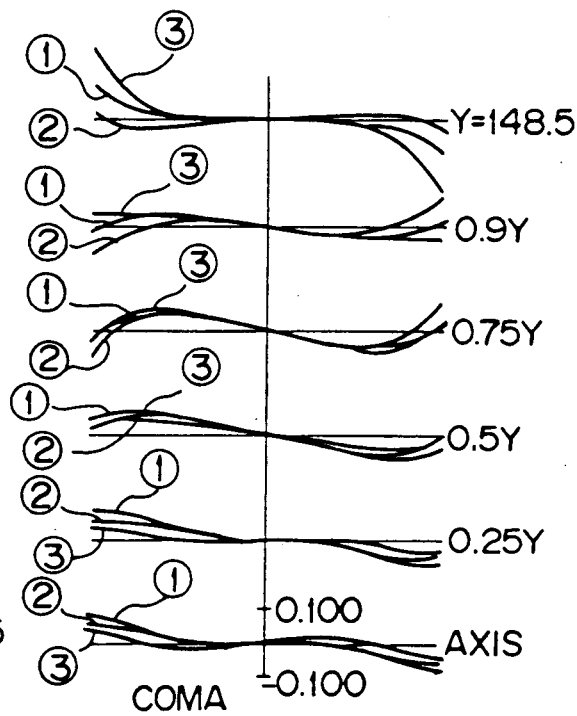
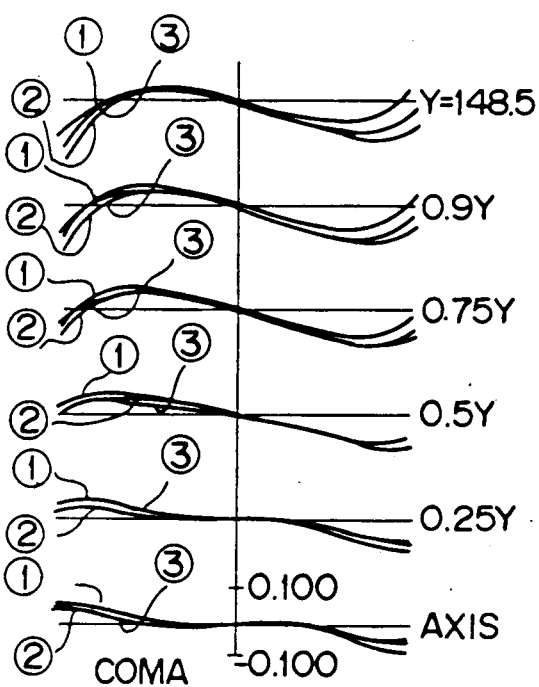

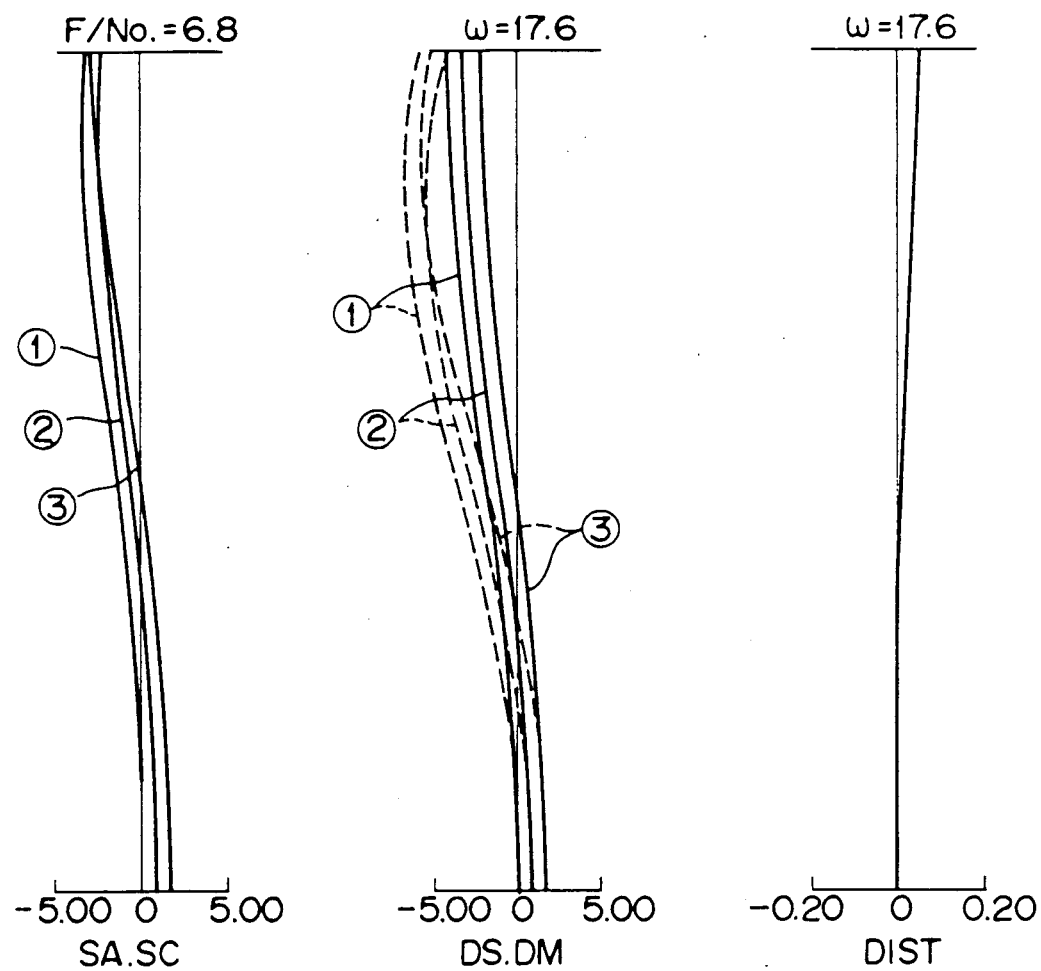

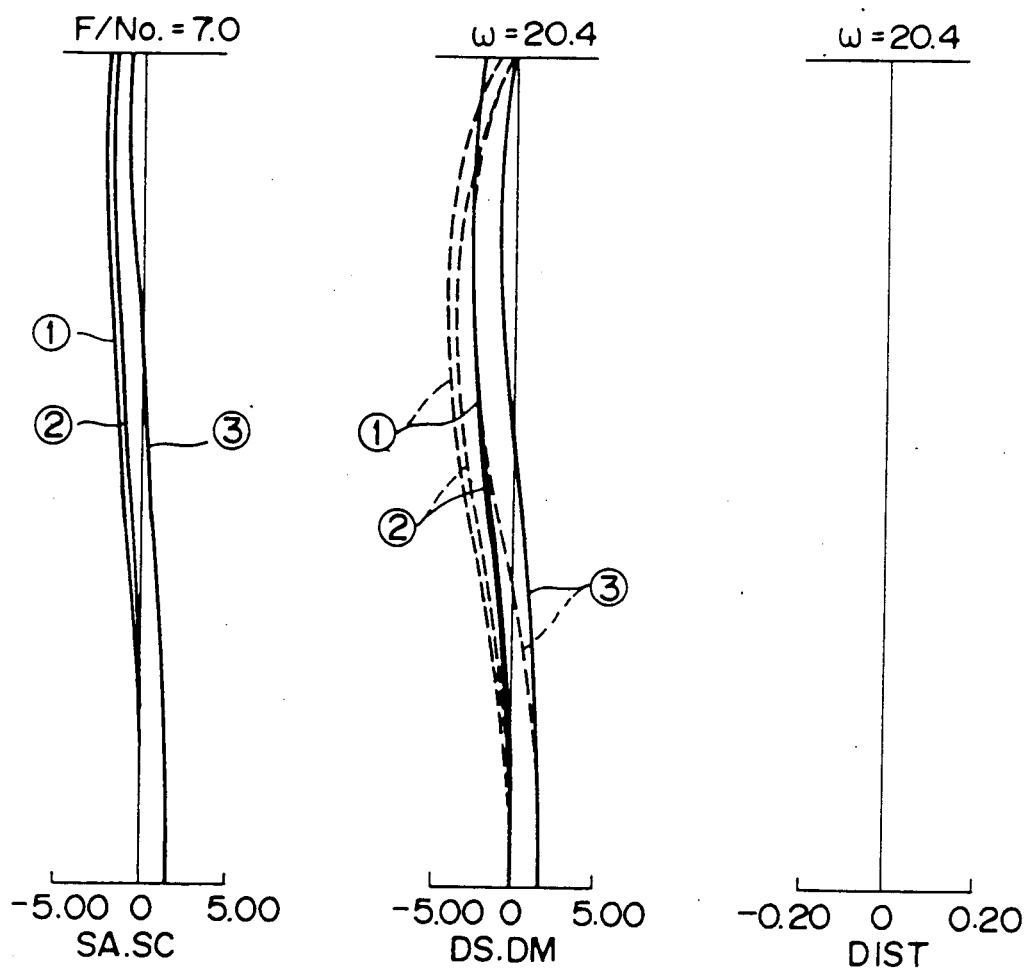

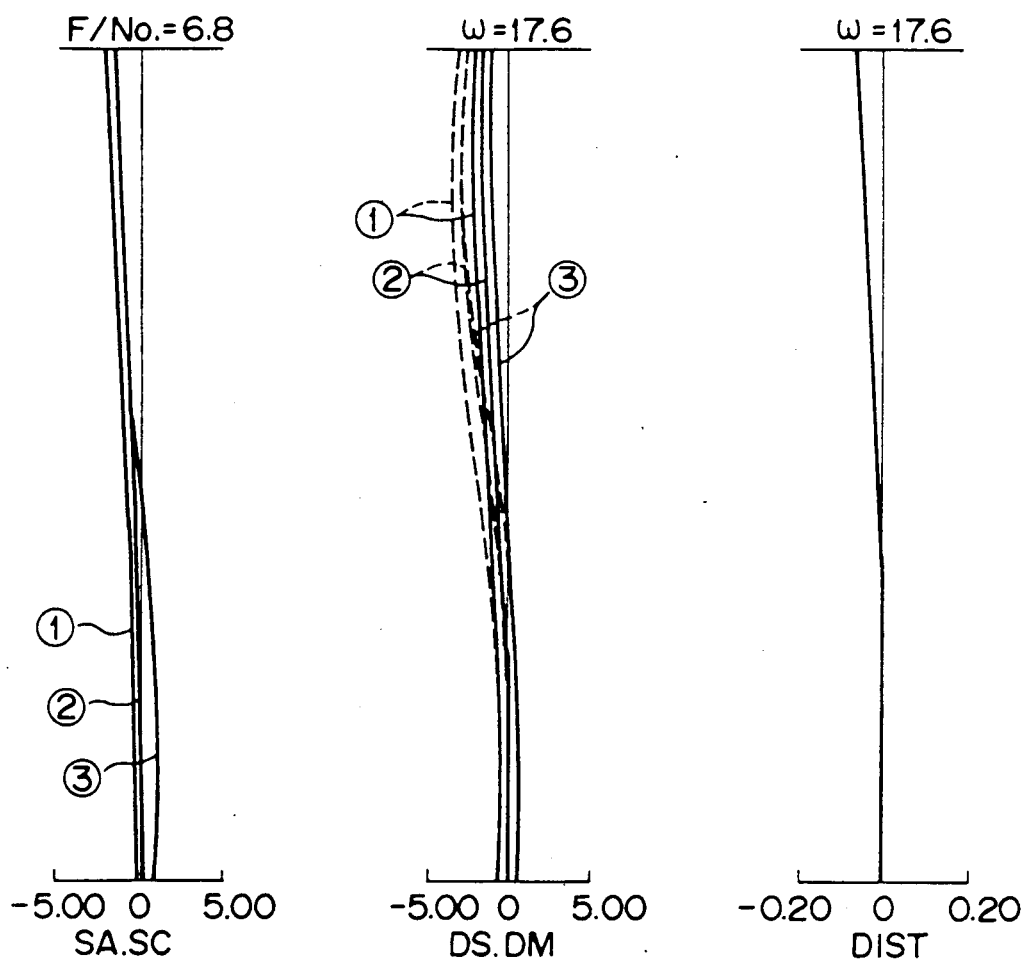

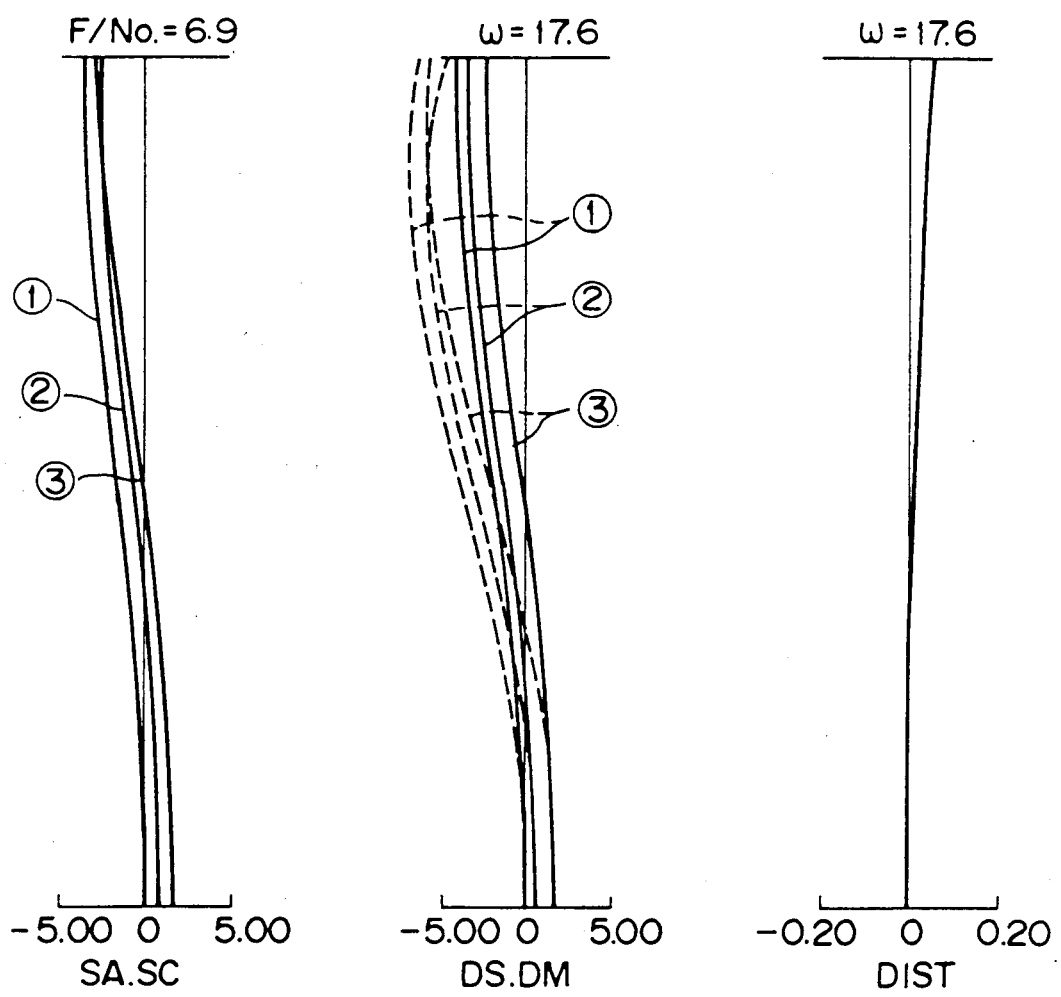

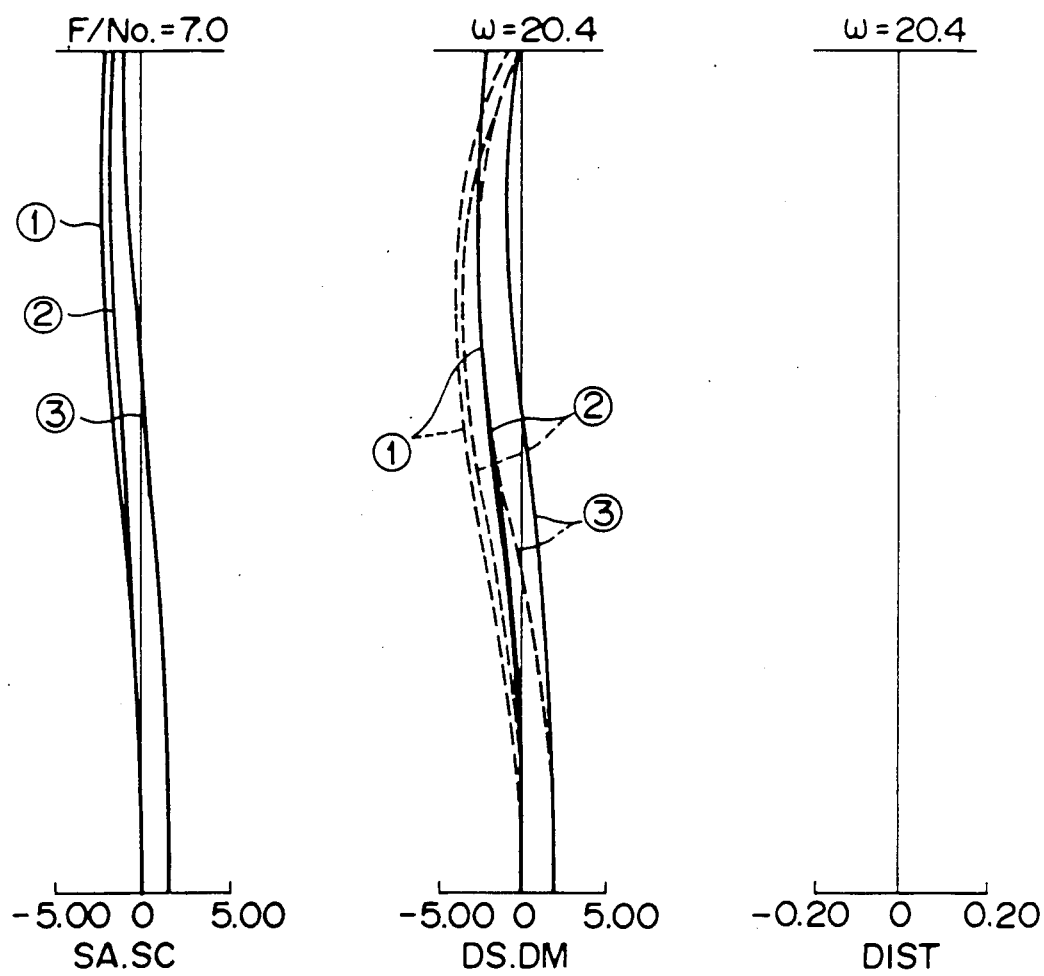
Fig. 21b1  Fig. 21b2  Fig. 21b3

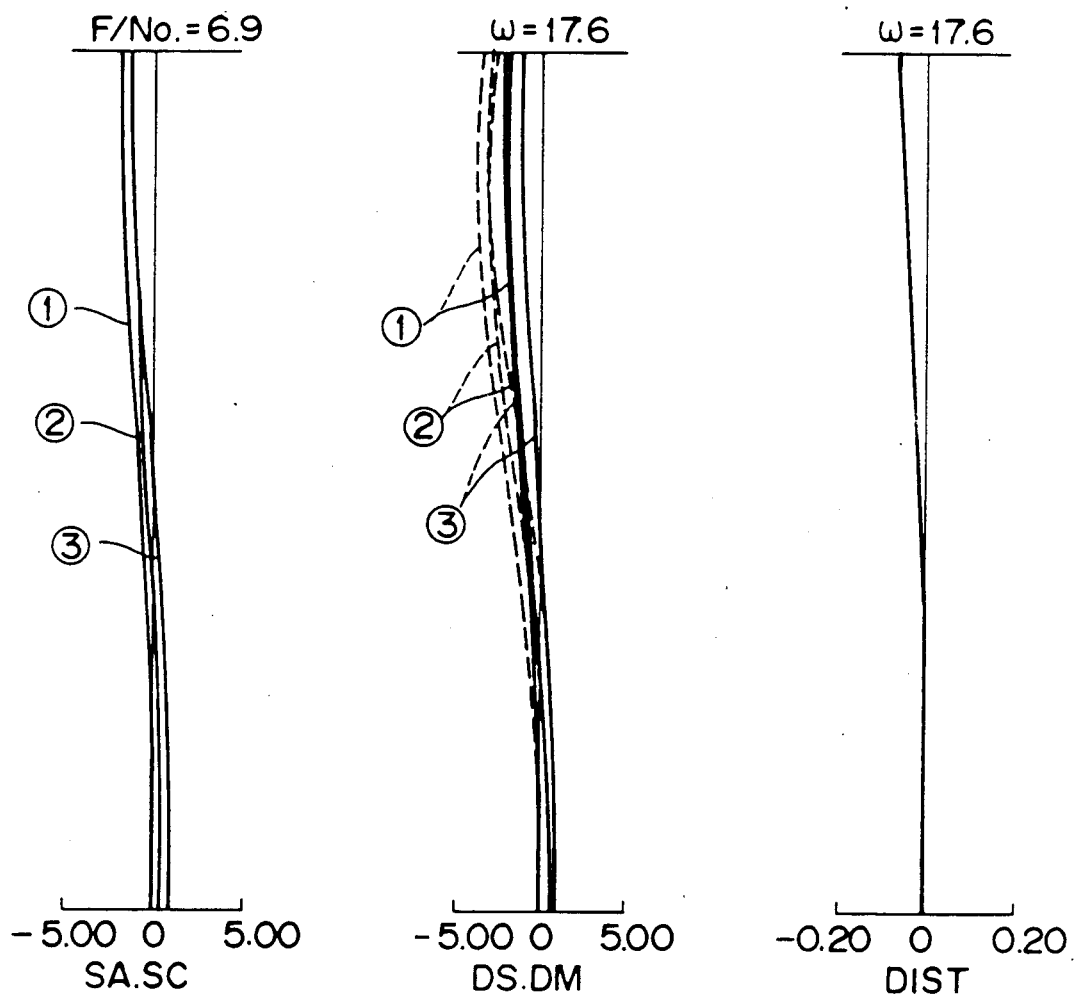

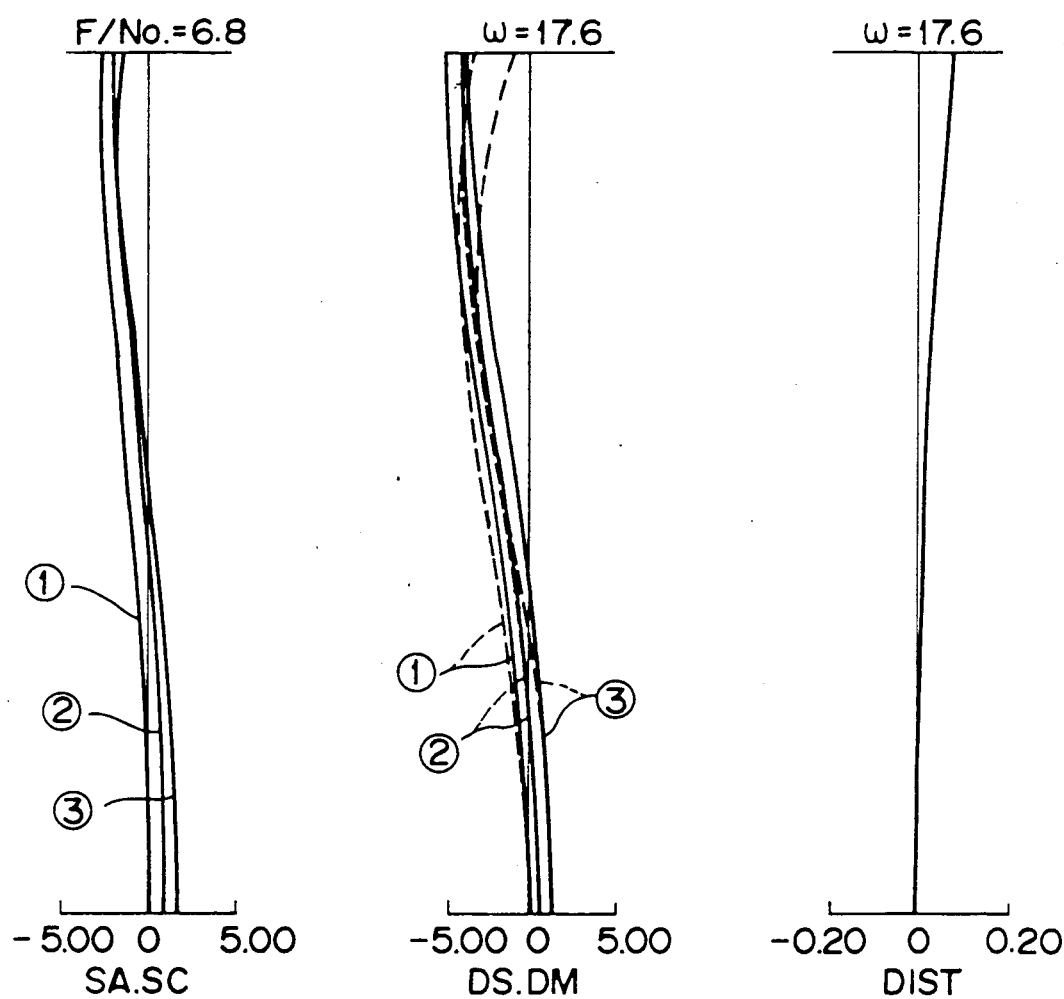

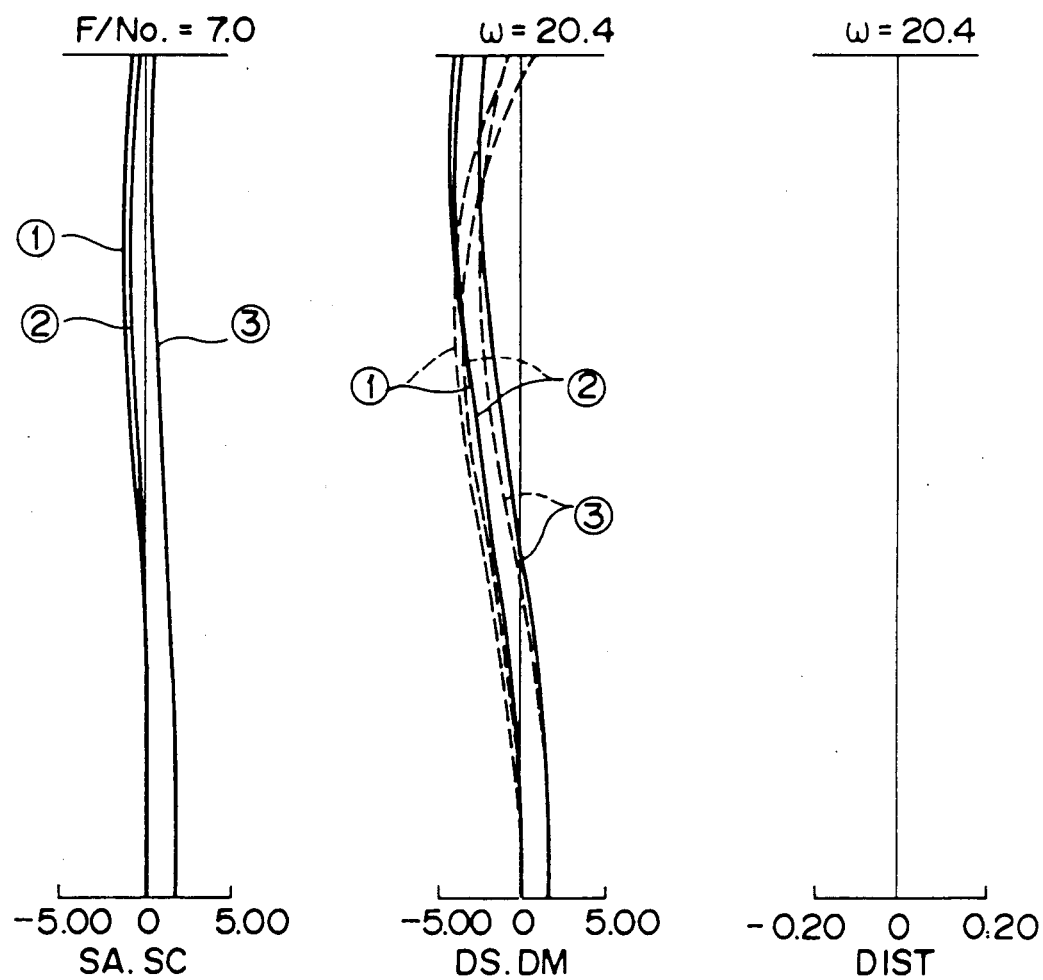

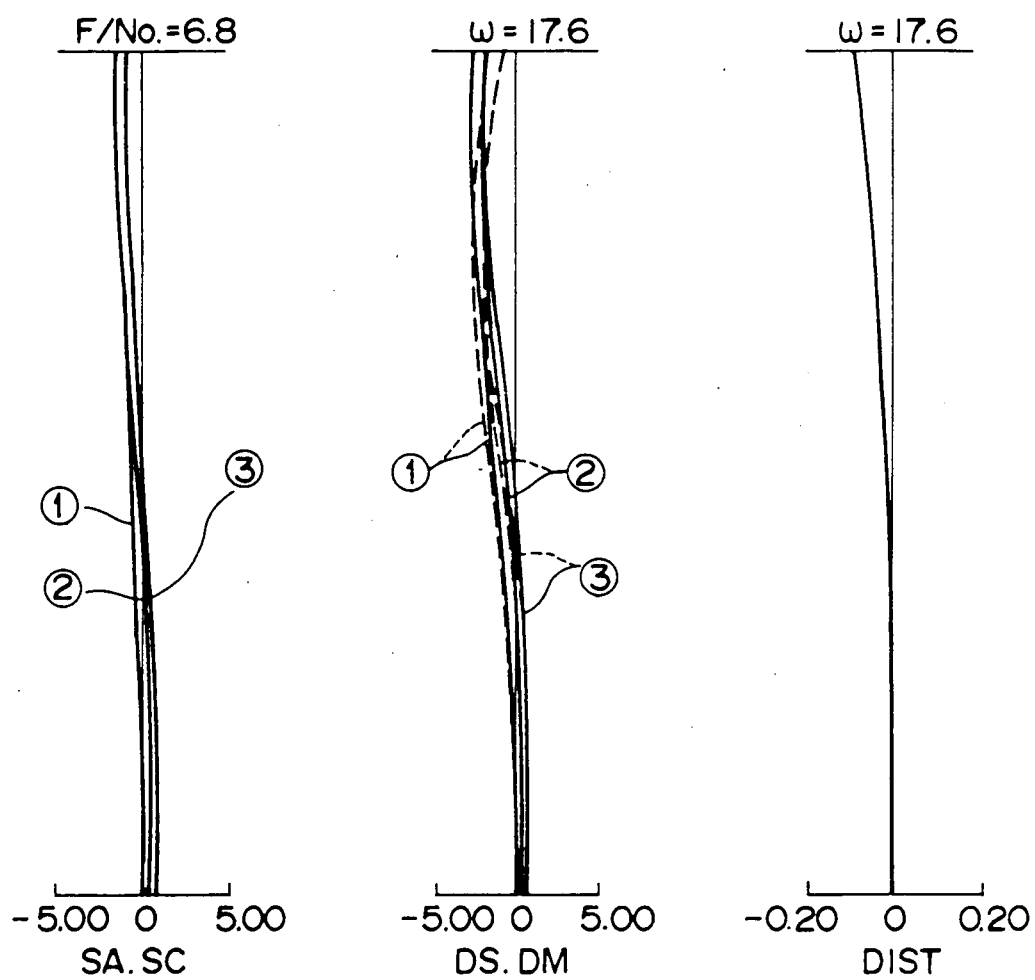

ZOOM LENS FOR VARIABLE MAGNIFICATION COPYING MACHINE

BACKGROUND OF THE INVENTION

1. Field of the Invention

The present invention relates to a zoom lens for a variable magnification copying machine. More particularly, the present invention relates to a zoom lens for suitably performing a zooming operation while a conjugate length (the distance between object images) from an object face to a formed image face is constantly held.

2. Description of the Related Art

It is possible to very efficiently treat documents for business by a copying machine, especially, an electrophotographic copying machine using plain paper. In the old main current of the copying machine, there was an equal magnification copying machine in which an original image and a hard copy image are equal to each other in size ratio so as to provide equal magnification. However, recently, there have been various kinds of needs with respect to the copying machine. A strong requirement with respect to the copying machine is to provide a function for obtaining a hard copy in a state in which the above size ratio is changed, i.e., a variable magnification function for obtaining copies enlarged or reduced in size.

In this case, there are various kinds of systems with respect to the variable magnification function. As an example, there is a system in which the magnification is changed by using a lens for equal magnification. As a concrete means of this example, there is a structure in which the magnification is changed by changing a conjugate length from a lens having a fixed focal distance to an object face and a conjugate length from this lens to a formed image face, i.e., the distance between object images. There is also another structure in which a converter lens is inserted on an optical path of the lens having the fixed focal distance when the image is enlarged or reduced in size.

When the magnification is changed by changing the above conjugate lengths, it is necessary to move a reflection mirror, etc., so as to change the conjugate lengths. These conjugate lengths are minimal at the time of the equal magnification and are increased as the magnification of the image is different from the equal magnification. Accordingly, when the magnification is changed in a wide range, the moving amounts of the reflection mirror, etc. are very large so that an entire optical system is large-sized. Further, there is a problem that the number of constructional parts is increased and it is necessary to dispose many members manufactured with especially high accuracy.

When the magnification is changed by inserting the converter lens on the above optical path, only one magnification is changed by one converter lens. Accordingly, the magnification is changed by stages by preparing a plurality of converter lenses for enlargement and reduction magnifications having high frequency in use to enlarge e.g., size B5 to A4 or reduce size A3 to A4 with respect to the image. Therefore, when the enlargement and reduction sizes are specified, for example, requirements for unifying and keeping the copy sizes can be satisfied, but the needs of users cannot be completely satisfied.

Further, these converter lenses are constructed by at least two lenses so that cost is high and these lenses must be prepared in accordance with a plurality of magnification stages. Accordingly, a mechanism for switching these lenses becomes complicated so that the cost of the entire copying machine is increased.

Therefore, a zoom lens for performing the zooming operation while the conjugate length from the object face to the formed image face is constantly held has been developed. Japanese Patent Application Laying Open (KOKAI) No. 61-151604 shows one example of such a zoom lens.

In this optical system, a group of lenses equal to those composed of concave, convex and concave lenses are symmetrically arranged around a diaphragm respectively on object and image face sides and are constructed such that first to sixth lenses are sequentially arranged from the object side. The first and sixth lenses construct two fixed lens groups. The second and third lenses construct a first movable lens group. The fourth and fifth lenses construct a second movable lens group. The above optical system is thus constructed by these four lens groups.

At the time of the equal magnification, the first to sixth lenses are located such that these lenses are respectively arranged symmetrically around the diaphragm on the object and image face sides. At the time of variable magnification, the first and second movable lens groups are moved by an equal amount around the diaphragm to enlarge and reduce the image in size.

However, in the variable magnification optical system shown in Japanese Patent Application Laying Open (KOKAI) No. 61-151604, F/No. is about 11 and therefore shows a dark state. Further, the magnification is changed by moving symmetrically the movable lens groups around the diaphragm. Therefore, the moving amount of each of the lens groups is small when the magnification is changed in the vicinity of the equal magnification, but is increased as the magnification of the image is different from the equal magnification on the enlargement or reduction side. In particular, this moving amount is rapidly increased approximately when the enlargement magnification approaches 1.414 times or the reduction magnification approaches 0.707 times. Therefore, it is necessary to secure large distances between the respective lens groups so that the entire lens length becomes very long. Further, at the time of the variable magnification, various kinds of performances for forming images especially at a magnification different from the equal magnification are greatly deteriorated.

The magnification is changed by symmetrically moving the movable lens groups by few lens groups such as four group lenses at the time of the variable magnification. Therefore, there are only four distances between lens faces for changing the focal distances of these lenses. Further, the number of parameters usable for correcting aberration is small so that the aberration cannot be sufficiently corrected.

SUMMARY OF THE INVENTION

It is therefore an object of the present invention to provide a compact zoom lens for a variable magnification copying machine in which magnification is changed while the conjugate length from an object face to an image face is constantly held and the zoom lens is bright and has high performance and the number of lenses is reduced.

The above object of the present invention can be achieved by a zoom lens for a variable magnification copying machine comprising a first lens composed of a concave lens; a second lens composed of a convex lens; a third lens composed of a meniscus concave lens and having a concave face on an object side; a diaphragm; a fourth lens composed of the same lens as the third lens and having a concave face on an image face side; a fifth lens composed of the same convex lens as the second lens; a sixth lens composed of the same concave lens as the first lens; the first to sixth group lenses being sequentially arranged from an object face toward the image face; the first to sixth lenses being symmetrically arranged around the diaphragm when the object is formed as an image on the image face at equal magnification; and means for symmetrically moving at least the first and sixth lenses among the first to sixth lenses and the diaphragm and moving the entire lens system in the direction of an optical axis when the object is formed by changing the magnification as an image on the image face so as to continuously change the magnification while a conjugate length from the object face to the image face is constantly held at the times of equal and variable magnifications.

When the focal distances of the first and second lenses are respectively set to f1 and f2 and a combined focal distance of the entire lens system at the time of the equal magnification is set to f0, the following conditions $0.35 < |f1/f0| < 0.7$ and $0.25 < f2/f0 < 0.45$ are satisfied.

In the above-mentioned zoom lens for a variable magnification copying machine in accordance with the present invention. The second, third, fourth and fifth lenses have a function for mainly correcting aberration as a master lens. The first and sixth lenses are additionally disposed outside the above master lens and have a function for effectively reducing the moving amounts of the lenses to change the focal distances thereof at the time of the variable magnification.

When the image is formed on the image face at equal magnification, the six group lenses are symmetrically arranged around the diaphragm. On the other hand, when the magnification is changed, the first and sixth lenses additionally disposed outside the master lens and a portion or all of the above master lens are moved to change the focal distance of the zoom lens. The entire lens system is further moved in the optical axis direction to change the magnification while the above conjugate length is fixed.

In the above structure for moving the respective lenses, the relation between the focal distance f1 of the first lens (or the focal distance f6 of the sixth lens) and the combined focal distance f0 of the entire lens system at the time of the equal magnification, and the relation between the focal distance f2 of the second lens (or the focal distance f5 of the fifth lens) and the above combined focal distance f0 are set by the following conditions.

$0.35 < |f1/f0| < 0.07$ and
$0.25 < f2/f0 < 0.45$

Thus, an arrangement of refracting power about the first lens (or the sixth lens) and the second lens (or the fifth lens) of the above master lens is determined so that the zoom lens is further made compact and a performance for forming the image is improved.

An upper limit value of $|f1/f0|$ is restricted to 0.7 to prevent the increase in the moving amount of a movable lens at the time of the variable magnification so that the entire lens system is made compact. A lower limit value of $|f1/f0|$ is restricted to 0.35 to prevent the generation of large aberration when tends to be caused with respect to the first and sixth lenses.

Further, upper and lower limit values of f2/f0 are respectively restricted to 0.45 and 0.25 so as not to excessively increase or decrease a Petzval's sum. Thus, the generation of astigmatism and field curvature is restricted as much as possible to prevent MTF from being deteriorated.

Further objects and advantages of the present invention will be apparent from the following description of the preferred embodiments of the present invention as illustrated in the accompanying drawings.

BRIEF DESCRIPTION OF THE DRAWINGS

FIGS. 2 to 4 are views for explaining a zoom lens in a first embodiment of the present invention in which:

FIG. 2a is a view showing the construction of the zoom lens at the time of enlargement in size of an image;

FIG. 2b is a view showing the construction of the zoom lens at the time of equal magnification in size of the image;

FIG. 2c is a view showing the construction of the zoom lens at the time of reduction in size of the image;

FIGS. 3a1 to 3a3 are diagrams respectively showing spherical aberration, astigmatism and distortion aberration at the time of enlargement in size of the image;

FIGS. 3b1 to 3b3 are diagrams respectively showing spherical aberration, astigmatism and distortion aberration at the time of equal magnification in size of the image;

FIGS. 3c1 to 3c3 are diagrams respectively showing spherical aberration, astigmatism and distortion aberration at the time of reduction in size of the image;

FIGS. 5 to 7 are views showing a zoom lens in a second embodiment of the present invention in which:

FIGS. 6a1 to 6a3 are diagrams respectively showing spherical aberration, astigmatism and distortion aberration at the time of enlargement in size of the image;

FIGS. 6b1 to 6b3 are diagrams respectively showing spherical aberration, astigmatism and distortion aberration at the time of equal magnification in size of the image;

FIGS. 6c1 to 6c3 are diagrams respectively showing spherical aberration, astigmatism and distortion aberration at the time of reduction in size of the image;

FIGS. 8 to 10 are views showing a zoom lens in a third embodiment of the present invention in which:

FIGS. 9a1 to 9a3 are diagrams respectively showing spherical aberration, astigmatism and distortion aberration at the time of enlargement in size of the image;

FIGS. 9b1 to 9b3 are diagrams respectively showing spherical aberration, astigmatism and distortion aberration at the time of equal magnification in size of the image;

FIGS. 9c1 to 9c3 are diagrams respectively showing spherical aberration, astigmatism and distortion aberration at the time of reduction in size of the image;

FIGS. 11 to 13 are views showing a zoom lens in a fourth embodiment of the present invention in which:

FIGS. 12a1 to 12a3 are diagrams respectively showing spherical aberration, astigmatism and distortion aberration at the time of enlargement in size of the image;

FIGS. 12b1 to 12b3 are diagrams respectively showing spherical aberration, astigmatism and distortion aberration at the time of equal magnification in size of the image;

FIGS. 12c1 to 12c3 are diagrams respectively showing spherical aberration, astigmatism and distortion aberration at the time of reduction in size of the image;

FIGS. 14 to 16 are views showing a zoom lens in a fifth embodiment of the present invention in which:

FIGS. 15a1 to 15a3 are diagrams respectively showing spherical aberration, astigmatism and distortion aberration at the time of enlargement in size of the image;

FIGS. 15b1 to 15b3 are diagrams respectively showing spherical aberration, astigmatism and distortion aberration at the time of equal magnification in size of the image;

FIGS. 15c1 to 15c3 are diagrams respectively showing spherical aberration, astigmatism and distortion aberration at the time of reduction in size of the image;

FIG. 16a is a diagram showing comatic aberration at the time of enlargement in size of the image;

FIG. 16b is a diagram showing comatic aberration at the time of equal magnification in size of the image;

FIG. 16c is a diagram showing comatic aberration at the time of reduction in size of the image;

FIGS. 17 to 19 are views showing a zoom lens in a sixth embodiment of the present invention in which:

FIGS. 18a1 to 18a3 are diagrams respectively showing spherical aberration, astigmatism and distortion aberration at the time of enlargement in size of the image;

FIGS. 18b1 to 18b3 are diagrams respectively showing spherical aberration, astigmatism and distortion aberration at the time of equal magnification in size of the image;

FIGS. 18c1 to 18c3 are diagrams respectively showing spherical aberration, astigmatism and distortion aberration at the time of reduction in size of the image;

FIGS. 20 to 22 are views showing a zoom lens in a seventh embodiment of the present invention in which:

FIGS. 21a1 to 21a3 are diagrams respectively showing spherical aberration, astigmatism and distortion aberration at the time of enlargement in size of the image;

FIGS. 21b1 to 21b3 are diagrams respectively showing spherical aberration, astigmatism and distortion aberration at the time of equal magnification in size of the image;

FIGS. 21c1 to 21c3 are diagrams respectively showing spherical aberration, astigmatism and distortion aberration at the time of reduction in size of the image;

FIGS. 23 to 25 are views showing a zoom lens in an eighth embodiment of the present invention in which:

FIGS. 24a1 to 24a3 are diagrams respectively showing spherical aberration, astigmatism and distortion aberration at the time of enlargement in size of the image;

FIGS. 24b1 to 24b3 are diagrams respectively showing spherical aberration, astigmatism and distortion aberration at the time of equal magnification in size of the image;

FIGS. 24c1 to 24c3 are diagrams respectively showing spherical aberration, astigmatism and distortion aberration at the time of reduction in size of the image;

DESCRIPTION OF THE PREFERRED EMBODIMENTS

The preferred embodiments of a zoom lens for a variable magnification copying machine in the present invention will next be described in detail with reference to the accompanying drawings.

Figure 1:
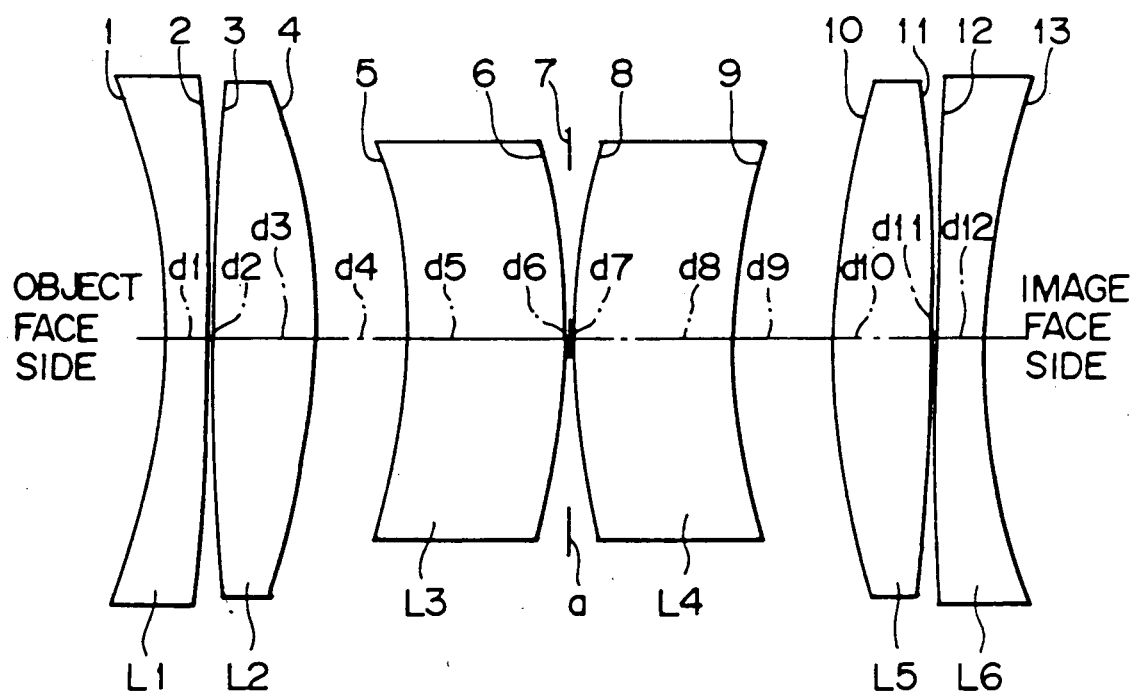
FIG. 1 is a view showing the basic construction of a zoom lens for a variable magnification copying machine.

FIG. 1 shows the basic construction of a zoom lens for a variable magnification copying machine in the present invention. The zoom lens in a first embodiment of the present invention will be described with reference to FIGS. 2a to 2c, 3a1 to 3a3, 3b1 to 3b3, 3c1 to 3c3, and 4a to 4c.

In FIG. 1 showing the basic construction of the zoom lens in this embodiment, the zoom lens is disposed between the side of an object face such as an original face in an electrophotographic copying machine and the side of an image face such as an exposure face of an image carrier such as a photosensitive drum. In this zoom lens, first to third lenses L1 to L3, a diaphragm a and fourth to sixth lenses L4 to L6 are sequentially arranged from the object face toward the image face.

The first lens L1 is constructed by a concave lens (a negative meniscus lens or a lens having concave faces on both sides thereof) formed by a concave face 1 located on the object side and a concave or convex face 2. The second lens L2 is constructed by a convex lens (a lens having convex faces on both sides thereof) formed by convex faces 3 and 4. The third lens L3 is constructed by a meniscus concave lens formed by a concave face 5 located on the object side and a convex face 6. The diaphragm a is located on a face 7 on the image face side of this third lens L3. The fourth lens L4 is arranged on the image face side of the diaphragm a. The fourth lens L4 is composed of a meniscus concave lens and has a convex face 8 located on the object side and a concave face 9. The convex face 8 has the same shape as that of the convex face 6 and the concave face 9 has the same shape as that of the concave face 5. The fifth lens L5 is arranged on the image face side of the fourth lens L4. The fifth lens L5 is composed of a convex lens (a lens having convex faces on both sides thereof) and has convex faces 10 and 11. The convex face 10 has the same shape as that of the convex face 4 and the convex face 11 has the same shape as that of convex face 3. The sixth lens L6 is arranged on the image face side of the fifth lens L5. The sixth lens L6 is composed of a lens having concave faces on both sides thereof or a meniscus concave lens having a concave face on the image face side. The sixth lens L6 has a concave or convex face 12 and a concave face 13. The face 12 has the same shape as that of the face 2 and the concave face 13 has the same shape as that of the concave face 1.

Radii r1 to r13 of curvature of the faces 1 to 13 forming first to sixth lenses L1 to L6, distances d1 to d12 between the faces 1 to 13 on an optical axis, respective refractive indexes N1 to N6 of the first to sixth lenses L1 to L6, and Abbe numbers ν1 to ν6 are set as shown in the following Table 1 (these values will be also shown in Tables 2 to 16 described later).

TABLE 1

| face No. | radius of curvature ri | | distance on optical axis di | refractive index Ni | | Abbe number νi |
|---|---|---|---|---|---|---|
| 1 | r1 | −50.531 | | | | |
| | | | d1 3.000 | N1 | 1.56339 | ν1 42.84 |
| 2 | r2 | 455.308 | | | | |
| | | | d2 variable | — | — | — |
| 3 | r3 | 161.830 | | | | |
| | | | d3 10.395 | N2 | 1.72000 | ν2 50.34 |
| 4 | r4 | −61.270 | | | | |
| | | | d4 variable | — | — | — |
| 5 | r5 | −38.009 | | | | |
| | | | d5 3.000 | N3 | 1.76182 | ν3 26.55 |
| 6 | r6 | −43.993 | | | | |
| | | | d6 variable | — | — | — |
| 7 | r7 | ∞ (diaphragm) | | | | |
| | | | d7 variable | — | — | — |
| 8 | r8 | 43.993 | | | | |
| | | | d8 3.000 | N4 | 1.76182 | ν4 26.55 |
| 9 | r9 | 38.009 | | | | |
| | | | d9 variable | — | — | — |
| 10 | r10 | 61.270 | | | | |
| | | | d10 10.395 | N5 | 1.72000 | ν5 50.34 |
| 11 | r11 | −161.830 | | | | |
| | | | d11 variable | — | — | — |
| 12 | r12 | −455.308 | | | | |
| | | | d12 3.000 | N6 | 1.56339 | ν6 42.84 |
| 13 | r13 | 50.531 | | | | |

With respect to the above-mentioned first to sixth lenses L1 to L6, when the focal distances of the first and second lenses L1 and L2 are respectively set to f1 and f2 and a combined focal distance of the entire lens system at the time of equal magnification is set to f0, the following conditions are satisfied.

$0.35 < |f1/f0| < 0.7$ and
$0.25 < f2/f0 < 0.45$

Namely, the respective values f1, f2 and f0 are provided as follows.

$f1 = -80.001$ $f2 = 62.955$ $f0 = 200.0$

Accordingly, the value $|f1/f0|$ is 0.400 and the value $f2/f0$ is 0.315.

The first and sixth lenses L1 and L6 are equal to each other although these lenses are arranged in directions opposite to each other. Further, the second and fifth lenses L2 and L5 are also equal to each other although these lenses are arranged in directions opposite to each other. Accordingly, when the focal distances of the sixth and fifth lenses L6 and L5 are respectively set to f6 and f5, the following conditions are naturally satisfied.

$0.35 < |f6/f0| < 0.7$ and
$0.25 < f5/f0 < 0.45$

As a result, the following formulas are provided.

$$|f1/f0| = |f6/f0|$$

and $$f2/f0 = f5/f0$$

The above condition
0.35 < |f1/f0| < 0.7 or
0.35 < |f6/f0| < 0.7
determines refracting powers of the first and sixth lenses L1 and L6.

When the value |f1/f0| = |f6/f0| exceed as upper limit value 0.7, the moving amount of a movable lens at the time of variable magnification is large so that the entire lens system cannot be made compact.

When the value |f1/f0| = |f6/f0| is less than a lower limit value 0.35, very large aberration is caused with respect to the first and sixth lenses L1 and L6. To correct this aberration, the number of lenses L1 and L6 must be increased so that cost is increased and the entire lens system cannot be made compact.

On the other hand, the above condition,
0.25 < f2/f0 < 0.45 or
0.25 < f5/f0 < 0.45
determines a refracting power arrangement of a master lens formed by the second and fifth lenses L2 and L5. When the value f2/f0 = f5/f0 exceeds an upper limit value 0.45, a Petzval's sum becomes large so that the image face is shifted in a negative direction with respect to this sum and astigmatism is increased.

When the value f2/f0 = f5/f0 is less than a lower limit value 0.25, the Petzval's sum becomes small so that image face is shifted in a positive direction with respect to this sum and field curvature is increased.

Further, when the value f2/f0 = f5/f0 exceeds the above upper limit value or is less than the above lower limit value, the image face on the optical axis and the image face outside the optical axis are unbalanced so that MTF is deteriorated.

In the above Table 1, the distances d2, d4, d6, d7, d9 and d11 on the optical axis at the time of the equal magnification are set to be different from those at the time of the variable magnification. In other words, the first to sixth lenses L1 to L6 are moved as shown in the following Table 2.

TABLE 2

| magnification m | 1.414 | 1.0 | 0.707 |
|---|---|---|---|
| combined focal distance f | 194 | 200 (f0) | 194 |
| distance d2 | 0.981 | 0.500 | 0.981 |
| distance d4 | 16.563 | 16.311 | 16.563 |
| distance d6 | 3.048 | 0.300 | 3.048 |
| distance d7 | 3.048 | 0.300 | 3.048 |
| distance d9 | 16.563 | 16.311 | 16.563 |
| distance d11 | 0.981 | 0.500 | 0.981 |
| F No. | 6.8 | 7.0 | 6.8 |
| height of object Y | 105.0 | 148.5 | 148.5 |
| half angle of view ω | 17.6° | 20.4° | 17.6° |

FIG. 2a shows the construction of the zoom lens formed by the first to sixth lenses L1 to L6, etc. set as shown in the above Table 1 at the time of enlargement (m=1.414) in size of an image. FIG. 2b shows the construction of the zoom lens at the time of equal magnification (m=1.0). FIG. 2c shows the construction of the zoom lens at the time of reduction (m=0.707) in size of the image.

In this case, the distance d2 on the optical axis between the first and second lenses L1 and L2 is respectively changed from 0.981 through 0.5 to 0.981 at the times of enlargement (m=1.414), equal magnification (m=1.0) and reduction (m=0.707) in size of the image.

In contrast to this, the distance d11 on the optical axis between the sixth and fifth lenses L6 and L5 is respectively changed from 0.981 through 0.5 to 0.981 at the times of enlargement (m=1.414), equal magnification (m=1.0) and reduction (m=0.707) in size of the image.

When the above two cases with respect to the distances d2 and d11 are compared with each other, it is clear that the first and sixth lenses L1 and L6 are symmetrically moved on the sides of enlargement and reduction in size with the equal magnification (m=1.0) as a boundary and the moving amounts of these lenses are equal to each other.

These results are similarly provided with respect to the relation in movement between the second and third lenses L2, L3 and the fourth and fifth lenses L4 and L5, i.e., the relation between the distances d4 and d9 on the optical axis. Further, the above results are similarly provided with respect to the relation between the distances d6 and d7 on the optical axis.

Accordingly, when the object is formed as an image on the image face at the equal magnification, the first to sixth lenses L1 to L6 are symmetrically arranged around the above diaphragm a. On the other hand, when the object is formed as an image on the image face by changing the magnification, the first to sixth lenses L1 to L6 are symmetrically moved by the same amount with respect to the diaphragm a at the times of enlargement and reduction in size.

The entire lens system is suitably moved in the optical axis direction between the object and image faces in accordance with the movement of the zoom lens by the zooming operation. Namely, all the lenses are moved on the object face side at the time of enlargement in size and are moved on the image face side at the time of reduction in size. Thus, the magnification can be continuously changed while the conjugate length from the object face to the image face is constantly held at the times of the equal and variable magnifications.

FIGS. 3a1, 3b1 and 3c1 show spherical aberration with respect to d line (587.56 nm) shown by mark 1, F line (486.13 nm) shown by mark 3, and C line (656.27 nm) shown by mark 2 corresponding to the lens constructions at the times of enlargement, equal magnification and reduction in size in the zoom lens in the first embodiment of the present invention respectively shown in FIGS. 2a to 2c. FIGS. 3a2, 3b2 and 3c2 show astigmatism with respect to the d line 1, the F line 3 and the C line 2 about each of sagittal and meridional rays. FIGS. 3a3, 3b3 and 3c3 show distortion aberration corresponding to the above lens constructions.

Figure 4A:
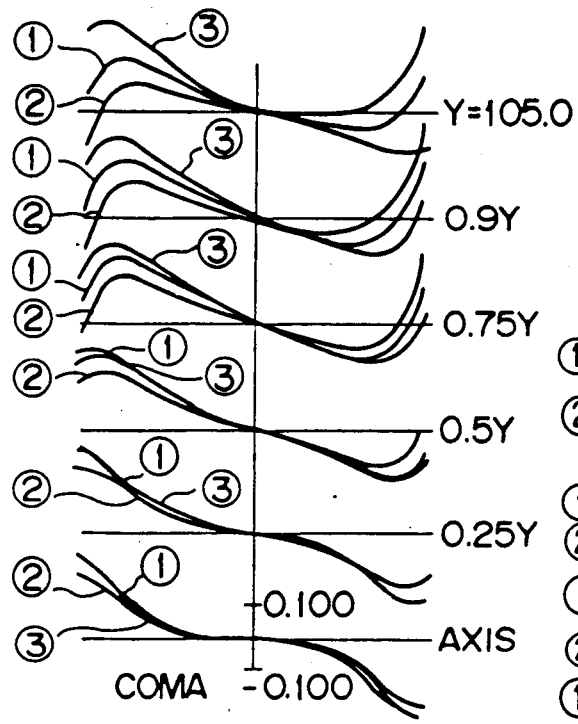
FIG. 4a is a diagram showing comatic aberration at the time of enlargement in size of the image.
Figure 4B:
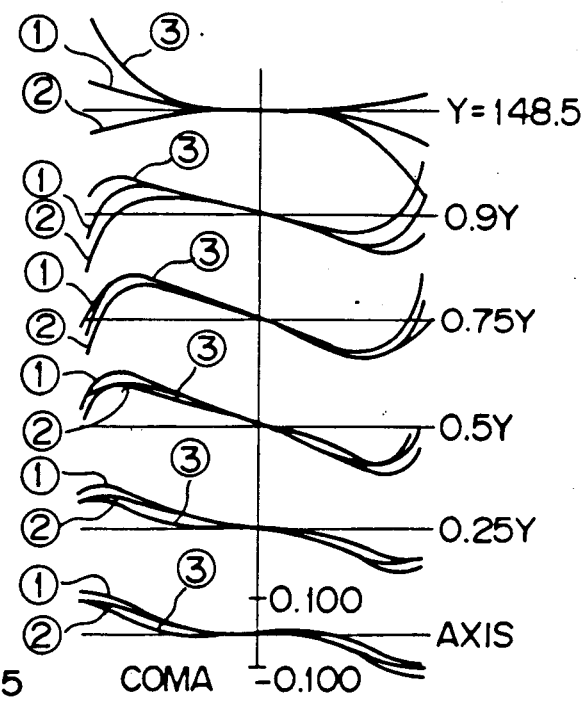
FIG. 4b is a diagram showing comatic aberration at the time of equal magnification in size of the image.
Figure 4C:
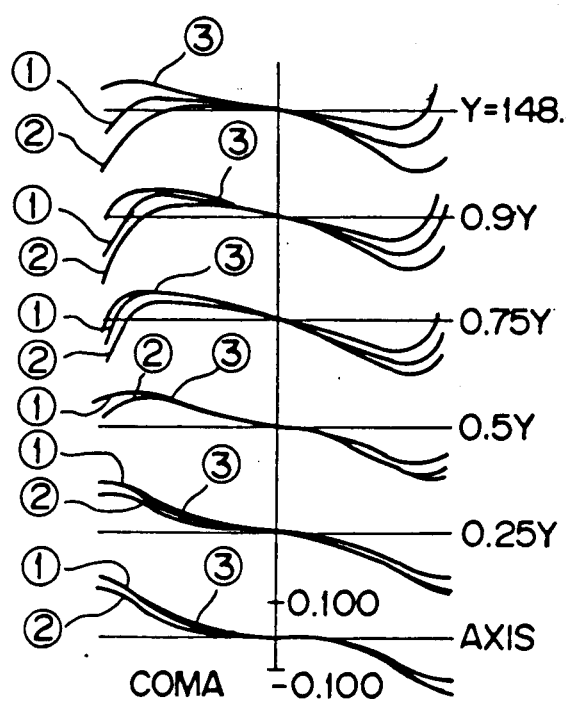
FIG. 4c is a diagram showing comatic aberration at the time of reduction in size of the image.

Similarly, FIGS. 4a to 4c respectively show comatic aberration with respect to the d line 1, the F line 3 and the C line 2 at the times of enlargement (m=2.0), equal magnification (m=1.0) and reduction (m=0.5) in size. FIG. 4a show the comatic characteristics when the height Y of the object is 105.0, the comatic characteristics in the cases of 0.9 Y, 0.75 Y, 0.5 Y and 0.25 Y and the comatic characteristics on the optical axis. FIGS. 4b and 4c show the comatic characteristics when the height Y of the object is 148.5, the comatic characteristics in the cases of 0.9 Y, 0.75 Y, 0.5 Y and 0.25 Y and the comatic characteristics on the optical axis.

In FIGS. 3a1, 3b1 and 3c1, reference numerals SA and SC respectively designate spherical aberration and sine condition which are shown by solid and broken lines.

In FIGS. 3a2, 3b2 and 3c2, reference numerals DS and DM designate astigmatism and the sagittal and meridional rays are respectively shown by solid and broken lines.

In FIGS. 3a3, 3b3 and 3c3, reference numeral DIST designates distortion aberration.

As can be seen from the above aberration diagrams, the comatic characteristics on the optical axis and the comatic characteristics outside the optical axis are balanced very well at each magnification. Further, with respect to the comatic aberration, a flare component is very small and is preferably corrected although vignetting factor is approximately 100%.

A characteristic curve of MTF with respect to spatial frequency is omitted in the figures, but the MTF characteristics show a very high contrast at the times of equal magnification, enlargement and reduction in size. Accordingly, it is possible to greatly improve the quality of a hard copy image finally obtained.

A zoom lens in a second embodiment of the present invention will next be described with reference to FIGS. 5a to 5c, 6a1 to 6a3, 6b1 to 6b3, 6c1 to 6c3, and 7a to 7c respectively showing lens construction, aberration, etc. at the times of enlargement, equal magnification and reduction in size. In the zoom lens in this embodiment, the above-mentioned values such as radius of curvature, etc. with respect to the first to sixth lenses L1 to L6 are provided as shown in the following Table 3.

TABLE 3

| face No. | radius of curvature ri | | distance on optical axis di | refractive index Ni | Abbe number νi |
|---|---|---|---|---|---|
| 1 | r1 | −56.917 | | | |
| | | | d1 3.000 | N1 1.56339 | ν1 42.84 |
| 2 | r2 | 17549.249 | | | |
| | | | d2 variable | — | — |
| 3 | r3 | 187.623 | | | |
| | | | d3 13.105 | N2 1.72000 | ν2 50.34 |
| 4 | r4 | −68.659 | | | |
| | | | d4 variable | — | — |
| 5 | r5 | −44.472 | | | |
| | | | d5 4.818 | N3 1.76182 | ν3 26.55 |
| 6 | r6 | −54.643 | | | |
| | | | d6 variable | — | — |
| 7 | r7 | ∞ (diaphragm) | | | |
| | | | d7 variable | — | — |
| 8 | r8 | 54.643 | | | |
| | | | d8 4.818 | N4 1.76182 | ν4 26.55 |
| 9 | r9 | 44.472 | | | |
| | | | d9 variable | — | — |
| 10 | r10 | 68.659 | | | |
| | | | d10 13.105 | N5 1.72000 | ν5 50.34 |
| 11 | r11 | −187.623 | | | |
| | | | d11 variable | — | — |
| 12 | r12 | −17549.249 | | | |
| | | | d12 3.000 | N6 1.56339 | ν6 42.84 |
| 13 | r13 | 56.917 | | | |

The distance d2, d4, d6, d7, d9 and d11 on the optical axis with respect to the first to sixth lenses L1 to L6 set as shown in the Table 3 are changed in accordance with each magnification as shown in the following Table 4.

TABLE 4

| | | | |
|---|---|---|---|
| magnification m | 1.414 | 1.0 | 0.707 |
| combined focal distance f | 194 | 200 (f0) | 194 |
| distance d2 | 1.111 | 0.500 | 1.111 |
| distance d4 | 15.072 | 15.383 | 15.072 |
| distance d6 | 0.911 | 0.300 | 0.911 |
| distance d7 | 0.911 | 0.300 | 0.911 |
| distance d9 | 15.072 | 15.683 | 15.072 |
| distance d11 | 1.111 | 0.500 | 1.111 |
| F No. | 6.8 | 7.0 | 6.8 |
| height of object Y | 105.0 | 148.5 | 148.5 |
| half angle of view ω | 17.6° | 20.4° | 17.6° |

Figure 5A:
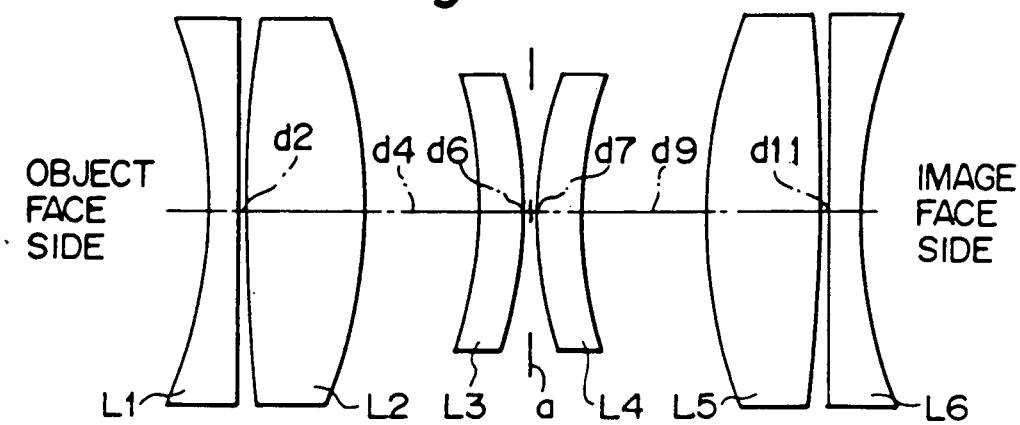
FIG. 5a is a view showing the construction of the zoom lens at the time of enlargement in size of an image.
Figure 5B:
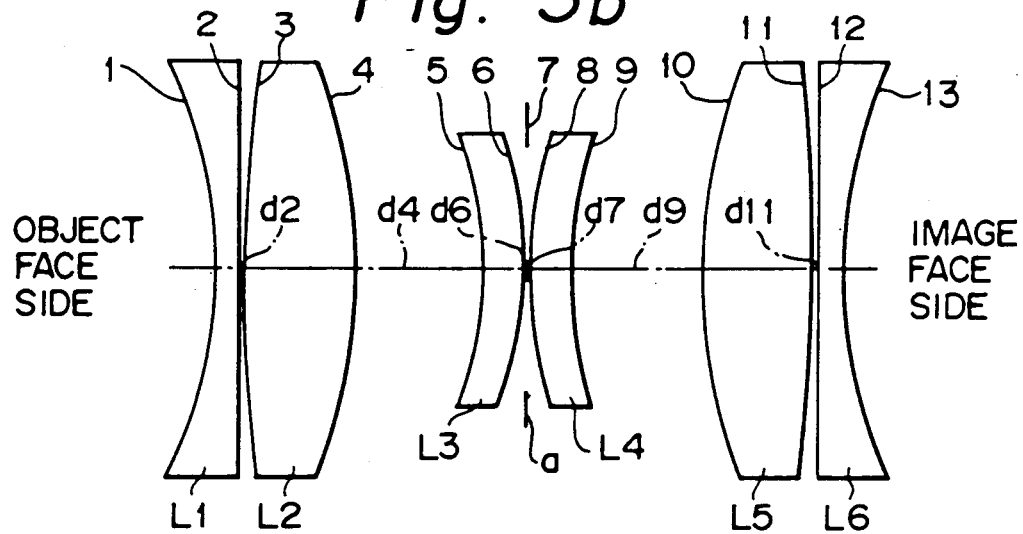
FIG. 5b is a view showing the construction of the zoom lens at the time of equal magnification in size of the image.
Figure 5C:
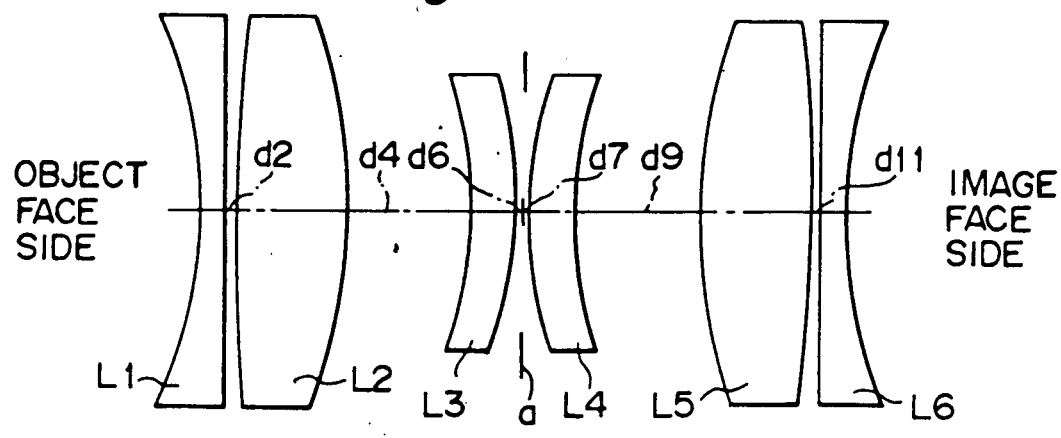
FIG. 5c is a view showing the construction of the zoom lens at the time of reduction in size of the image.

FIG. 5a shows the construction of the zoom lens formed by the first to sixth lenses L1 to L6, etc. set as shown in the Tables 3 and 4 at the time of enlargment (m=1.414) in size. FIG. 5b shows the construction of the zoom lens at the time of equal magnification (m=1.0). FIG. 5c shows the construction of the zoom lens at the time of reduction (m=0.707) in size.

In this second embodiment, similar to the above-mentioned first embodiment, it is possible to provide a zoom lens for a variable magnification copying machine in which the magnification is continuously changed while the conjugate length from an object face to an image face is constantly held at the times of equal and variable magnifications.

FIGS. 6a1, 6b1 and 6c1 respectively show spherical aberration corresponding to the lens constructions as above at the times of enlargement, equal magnification and reduction in size in the second embodiment of the present invention shown in FIGS. 5a, 5b and 5c. FIGS. 6a2, 6b2 and 6c2 show astigmatism corresponding to the above lens constructions. FIGS. 6a3, 6b3 and 6c3 show distortion aberration corresponding to the above lens constructions.

Figure 7A:
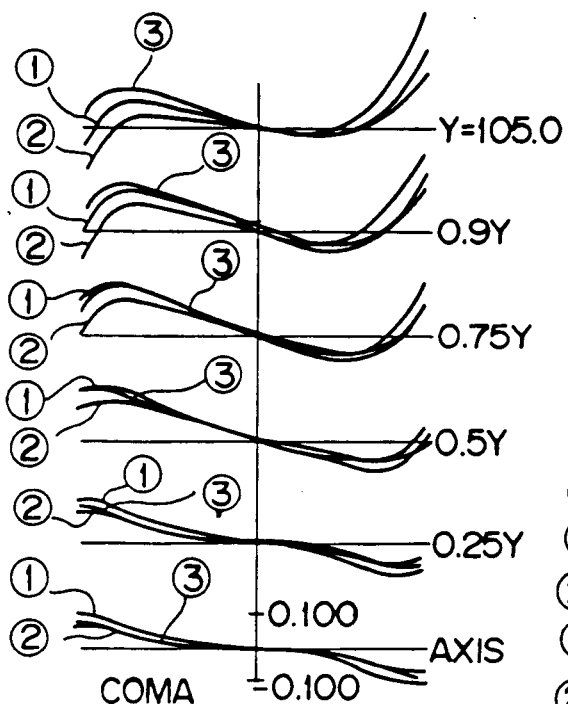
FIG. 7a is a diagram showing comatic aberration at the time of enlargement in size of the image.
Figure 7B:
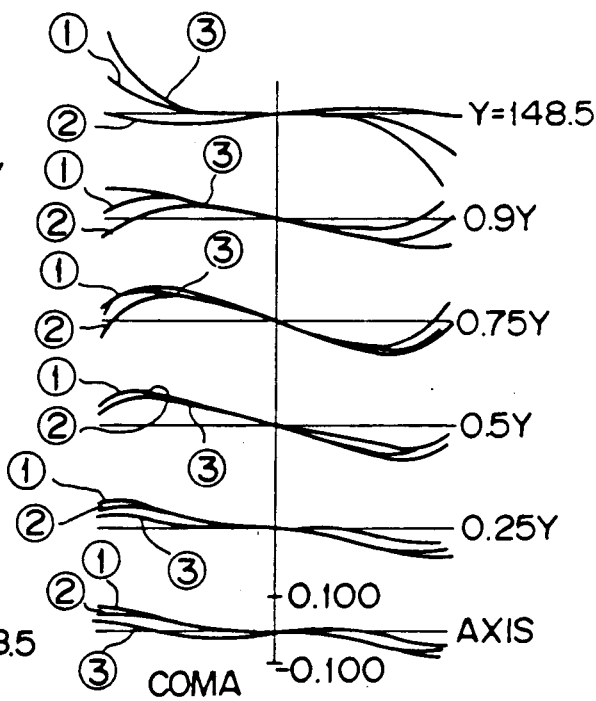
FIG. 7b is a diagram showing comatic aberration at the time of equal magnification in size of the image.
Figure 7C:
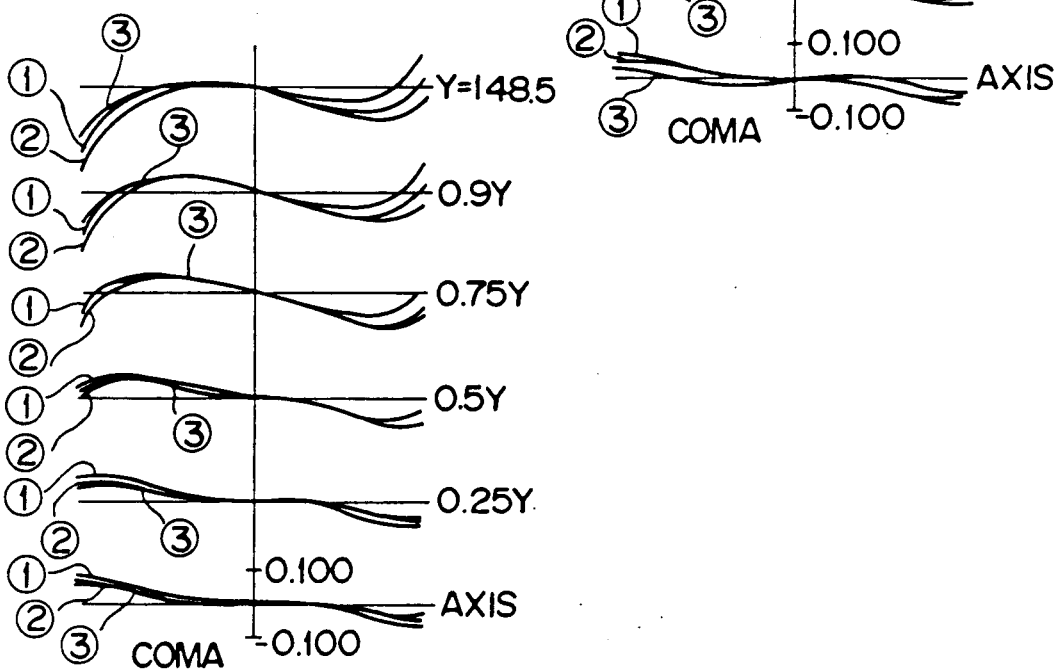
FIG. 7c is a diagram showing comatic aberration at the time of reduction in size of the image.

Similarly, FIGS. 7a to 7c show comatic aberration corresponding to the above lens constructions.

A zoom lens in a third embodiment of the present invention will next be described with reference to FIGS. 8a to 8c, 9a1 to 9a3, 9b1 to 9b3, 9c1 to 9c3, and 10a to 10c respectively showing lens construction, aberration, etc. at the times of enlargement, equal magnification and reduction in size. In the zoom lens in this embodiment, the above-mentioned values such as radius of curvature, etc. with respect to the first to sixth lenses L1 to L6 are provided as shown in the following Table 5.

TABLE 5

| face No. | radius of curvature ri | | distance on optical axis di | refractive index Ni | Abbe number νi |
|---|---|---|---|---|---|
| 1 | r1 | −55.210 | | | |
| | | | d1 3.000 | N1 1.56339 | ν1 42.48 |
| 2. | r2 | −479.519 | | | |
| | | | d2 0.500 | — | — |
| 3 | r3 | 1185.320 | | | |
| | | | d3 10.565 | N2 1.72000 | ν2 50.34 |
| 4 | r4 | −55.428 | | | |
| | | | d4 variable | — | — |
| 5 | r5 | −47.325 | | | |
| | | | d5 8.069 | N3 1.76182 | ν3 26.55 |
| 6 | r6 | −61.267 | | | |
| | | | d6 variable | — | — |
| 7 | r7 | ∞ (diaphragm) | | | |
| | | | d7 variable | — | — |
| 8 | r8 | 61.267 | | | |

TABLE 5-continued

| face No. | radius of curvature ri | | distance on optical axis di | refractive index Ni | | Abbe number νi |
|---|---|---|---|---|---|---|
| 9 | r9 | 47.325 | | | | |
| | | | d8 | 8.069 | N4 1.76182 | ν4 26.55 |
| | | | d9 | variable | — — | — — |
| 10 | r10 | 55.428 | | | | |
| | | | d10 | 10.565 | N5 1.72000 | ν5 50.34 |
| 11 | r11 | −1185.320 | | | | |
| | | | d11 | 0.500 | — — | — — |
| 12 | r12 | 479.519 | | | | |
| | | | d12 | 3.000 | N6 1.56339 | ν6 42.84 |
| 13 | r13 | 55.210 | | | | |

The distances d4, d6, d7 and d9 on the optical axis with respect to the first to sixth lenses L1 to L6 set as shown in the Table 5 are changed in accordance with each magnification as shown in the following Table 6.

TABLE 6

| magnification m | 1.414 | 1.0 | 0.707 |
|---|---|---|---|
| combined focal distance f | 195 | 200 (f0) | 195 |
| distance d4 | 2.874 | 4.920 | 2.874 |
| distance d6 | 0.3 | 12.947 | 0.3 |
| distance d7 | 0.3 | 12.947 | 0.3 |
| distance d9 | 2.874 | 4.920 | 2.874 |
| F No. | 7.1 | 7.0 | 7.1 |
| height of object Y | 105.0 | 148.5 | 148.5 |
| half angle of view ω | 17.6° | 20.4° | 19.5° |

Figure 8A:
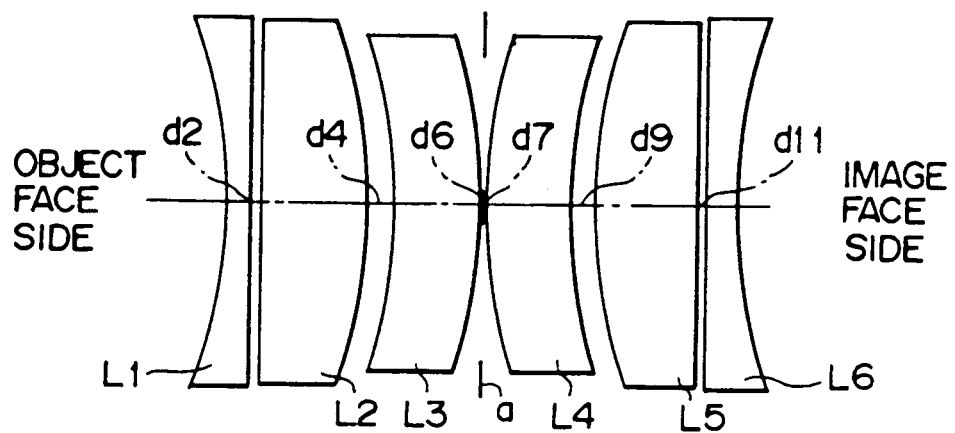
FIG. 8a is a view showing the construction of the zoom lens at the time of enlargement in size of an image.
Figure 8B:
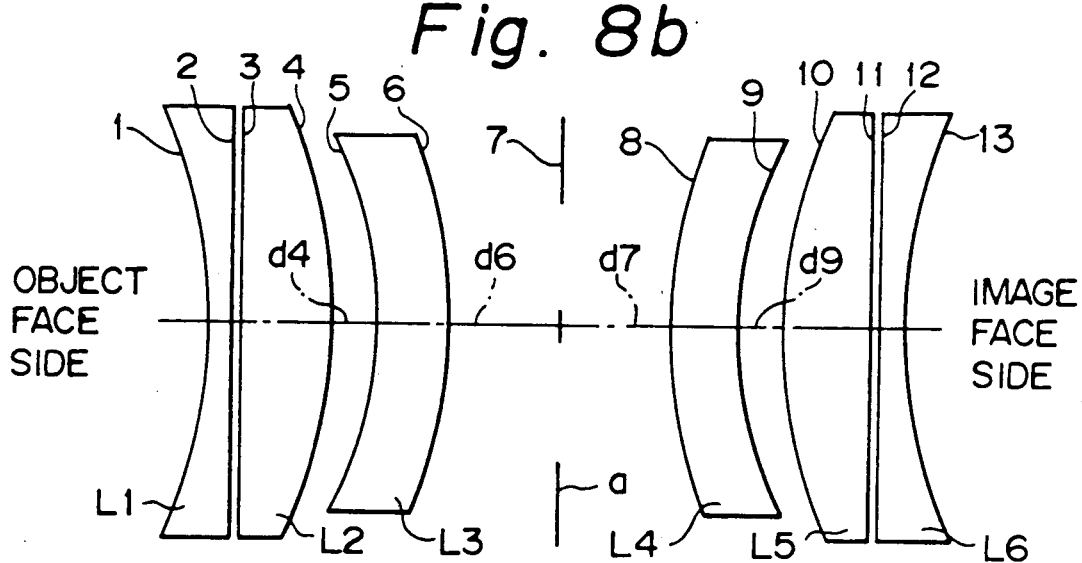
FIG. 8b is a view showing the construction of the zoom lens at the time of equal magnification in size of the image.
Figure 8C:
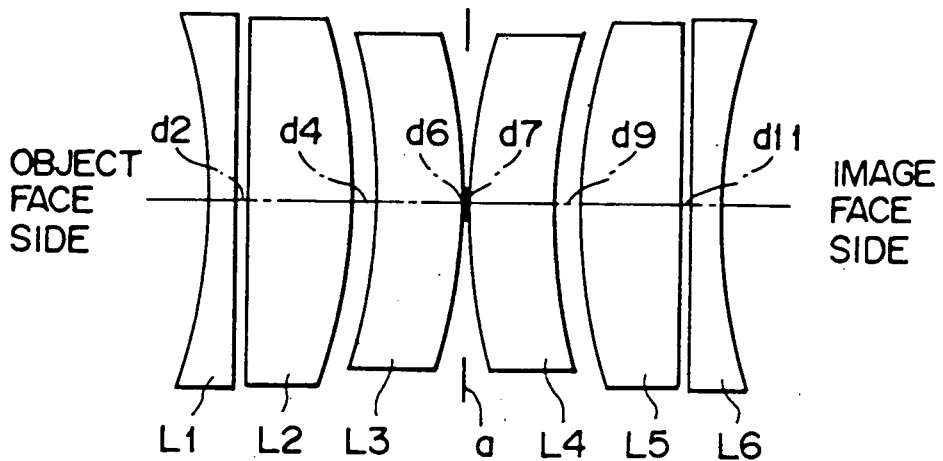
FIG. 8c is a view showing the construction of the zoom lens at the time of reduction in size of the image.

FIG. 8a shows the construction of the zoom lens formed by the first to sixth lenses L1 to L6, etc. set as shown in the Tables 5 and 6 at the time of enlargement (m=1.414) in size. FIG. 8b shows the construction of the zoom lens at the time of equal magnification (m=1.0). FIG. 8c shows the construction of the zoom lens at the time of reduction (m=0.707) in size.

In this third embodiment, similar to the above-mentioned embodiments, it is possible to provide a zoom lens for a variable magnification copying machine in which the magnification is continuously changed while the conjugate length from an object face to an image face is constantly held at the times of equal and variable magnifications.

FIGS. 9a1, 9b1 and 9c1 respectively show spherical aberration corresponding to the lens constructions as above at the times of enlargement, equal magnification and reduction in size shown in FIGS. 8a, 8b and 8c. FIGS. 9a2, 9b2 and 9c2 show astigmatism corresponding to the above lens constructions. FIGS. 9a3, 9b3 and 9c3 show distortion aberration corresponding to the above lens constructions.

Figure 10A:
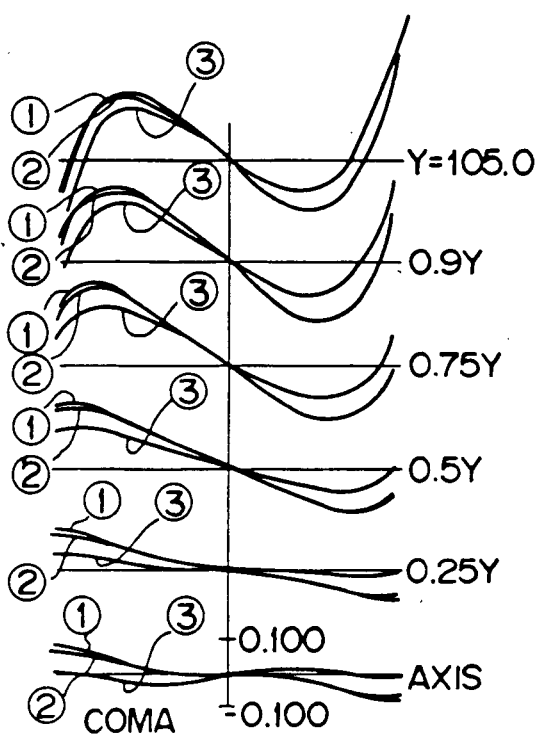
FIG. 10a is a diagram showing comatic aberration at the time of enlargement in size of the image.
Figure 10B:
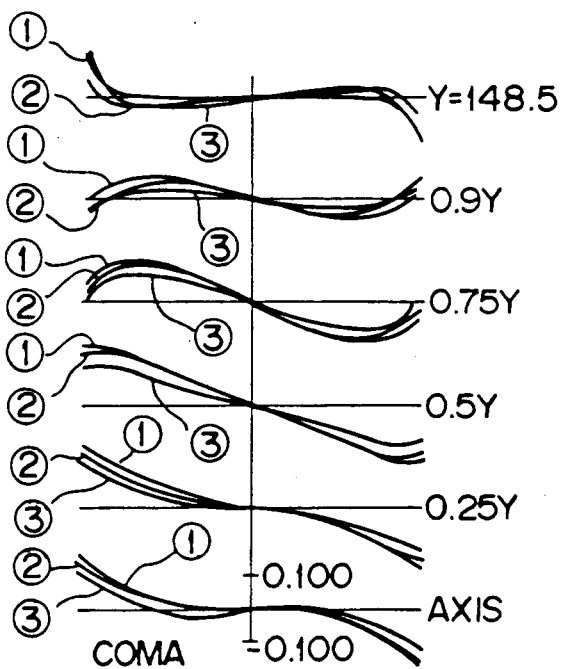
FIG. 10b is a diagram showing comatic aberration at the time of equal magnification in size of the image.
Figure 10C:
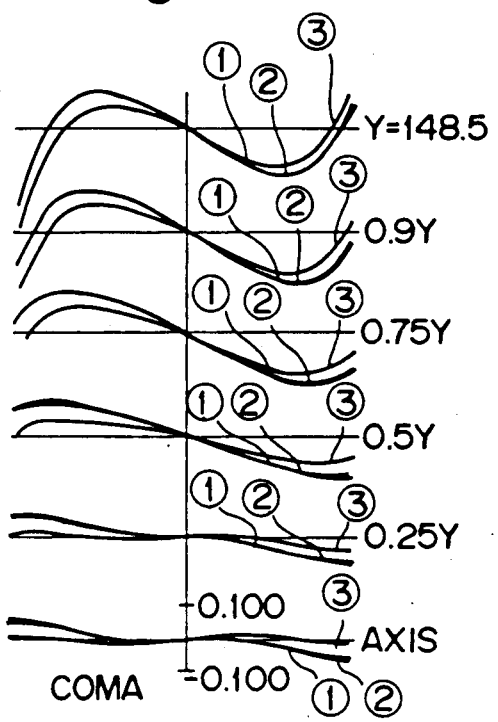
FIG. 10c is a diagram showing comatic aberration at the time of reduction in size of the image.

Similarly, FIGS. 10a to 10c respectively show comatic aberration corresponding to the above lens constructions at the times of enlargement, equal magnification and reduction in size.

A zoom lens in a fourth embodiment of the present invention will be next described with reference to FIGS. 11a to 11c, 12a1 to 12a3, 12b1 to 12b3, 12c1 to 12c3, and 13a to 13c respectively showing lens construction, aberration, etc. at the times of enlargement, equal magnification and reduction in size. In the zoom lens in this embodiment, the above-mentioned values such as radius of curvature, etc. with respect to the first to sixth lenses L1 to L6 are provided as shown in the following Table 7.

TABLE 7

| face No. | radius of curvature ri | | distance on optical axis di | refractive index Ni | | Abbe number νi |
|---|---|---|---|---|---|---|
| 1 | r1 | −57.784 | | | | |
| | | | d1 | 3.000 | N1 1.56339 | ν1 42.84 |
| 2 | r2 | −690.953 | | | | |
| | | | d2 | variable | — — | — — |
| 3 | r3 | 215.372 | | | | |
| | | | d3 | 8.966 | N2 1.72000 | ν2 50.34 |
| 4 | r4 | −68.469 | | | | |
| | | | d4 | variable | — — | — — |
| 5 | r5 | −46.904 | | | | |
| | | | d5 | 7.713 | N3 1.76182 | ν3 26.55 |
| 6 | r6 | −60.797 | | | | |
| | | | d6 | variable | — — | — — |
| 7 | r7 | ∞ (diaphragm) | | | | |
| | | | d7 | variable | — — | — — |
| 8 | r8 | 60.797 | | | | |
| | | | d8 | 7.713 | N4 1.76182 | ν4 26.55 |
| 9 | r9 | 46.904 | | | | |
| | | | d9 | variable | — — | — — |
| 10 | r10 | 68.469 | | | | |
| | | | d10 | 8.966 | N5 1.72000 | ν5 50.34 |
| 11 | r11 | −215.372 | | | | |
| | | | d11 | variable | — — | — — |
| 12 | r12 | 690.953 | | | | |
| | | | d12 | 3.000 | N6 1.56339 | ν6 42.84 |
| 13 | r13 | 57.784 | | | | |

The distances d2, d4, d6, d7, d9 and d11 on the optical axis with respect to the first to sixth lenses L1 to L6 set as shown in the Table 7 are changed in accordance with each magnification as shown in the following Table 8.

TABLE 8

| magnification m | 1.414 | 1.0 | 0.707 |
|---|---|---|---|
| combined focal distance f | 194 | 200 (f0) | 194 |
| distance d2 | 1.252 | 0.500 | 1.252 |
| distance d4 | 13.968 | 13.688 | 13.968 |
| distance d6 | 1.784 | 0.300 | 1.784 |
| distance d7 | 1.784 | 0.300 | 1.784 |
| distance d9 | 13.968 | 13.688 | 13.968 |
| distance d11 | 1.252 | 0.500 | 1.252 |
| F No. | 6.8 | 7.0 | 6.8 |
| height of object Y | 105.0 | 148.5 | 148.5 |
| half angle of view ω | 17.6° | 20.4° | 17.6° |

Figure 11A:
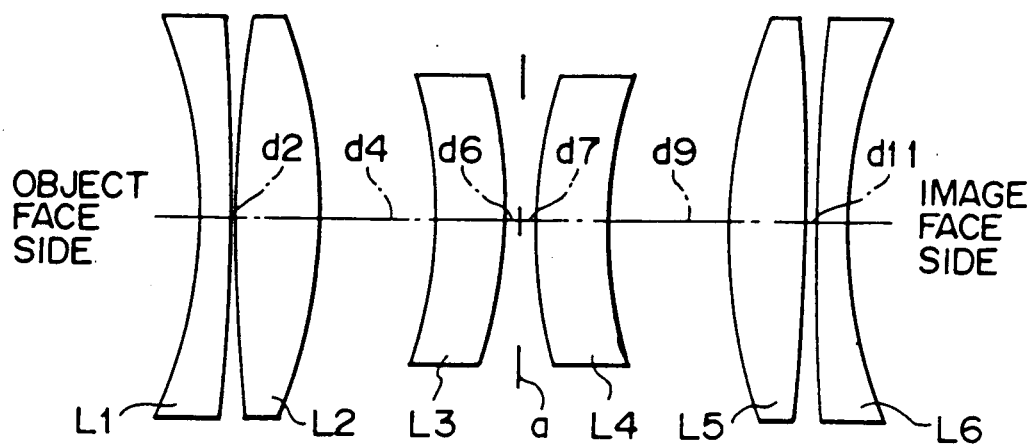
FIG. 11a is a view showing the construction of the zoom lens at the time of enlargement in size of an image.
Figure 11B:
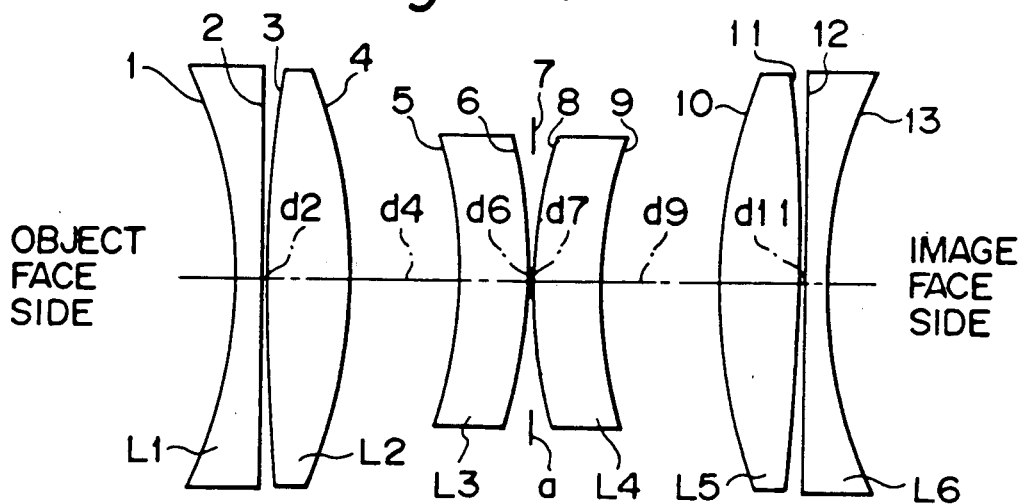
FIG. 11b is a view showing the construction of the zoom lens at the time of equal magnification in size of the image.
Figure 11C:
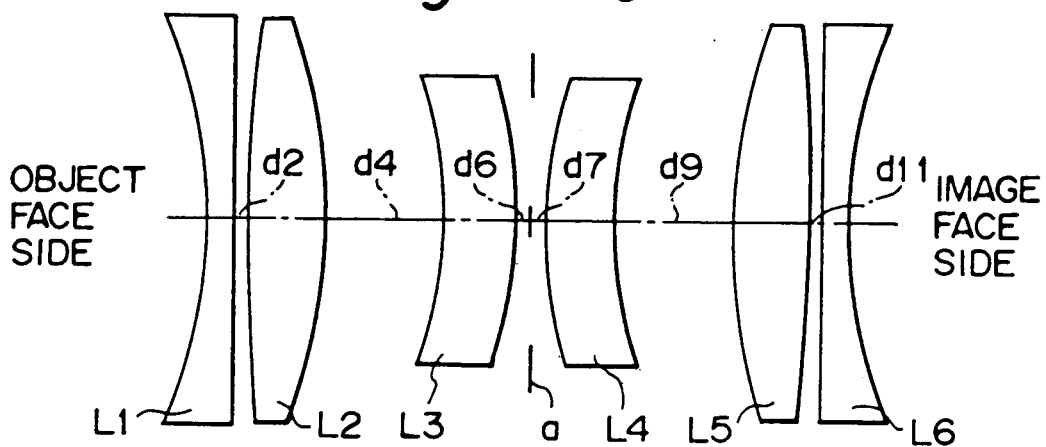
FIG. 11c is a view showing the construction of the zoom lens at the time of reduction in size of the image.

FIG. 11a shows the construction of the zoom lens formed by the first to sixth lenses L1 to L6, etc. set as shown in the Tables 7 and 8 at the time of enlargement (m=1.414) in size. FIG. 11b shows the construction of the zoom lens at the time of equal magnification (m=1.0). FIG. 11c shows the construction of the zoom lens at the time of reduction (m=0.707) in size.

In this fourth embodiment, similar to the above-mentioned embodiments, it is possible to provide a zoom lens for a variable magnification copying machine in which the magnification is continuously changed while the conjugate length from an object face to an image face is constantly held at the times of equal and variable magnifications.

FIGS. 12a1, 12b1 and 12c1 respectively show spherical aberration corresponding to the lens constructions as above at the times of enlargement, equal magnification and reduction in size shown in FIGS. 11a, 11b and 11c. FIGS. 12a2, 12b2 and 12c2 show astigmatism corresponding to the above lens constructions. FIGS. 12a3, 12b3 and 12c3 show distortion aberration corresponding to the above lens constructions.

Figure 13A:
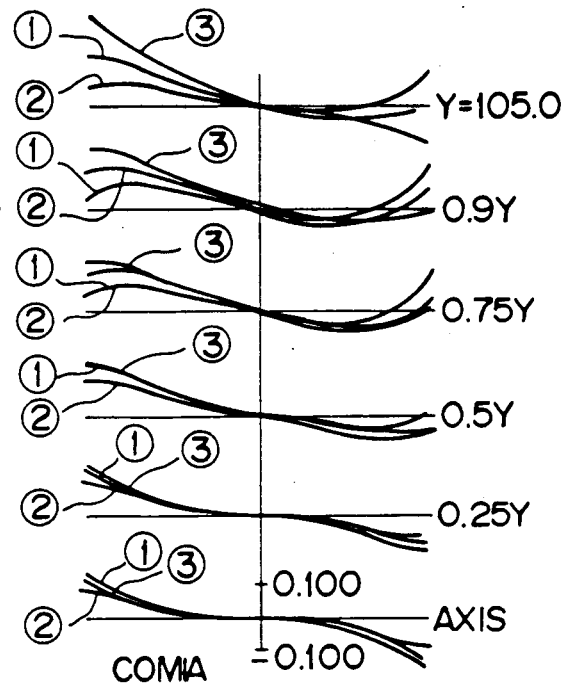
FIG. 13a is a diagram showing comatic aberration at the time of enlargement in size of the image.
Figure 13B:
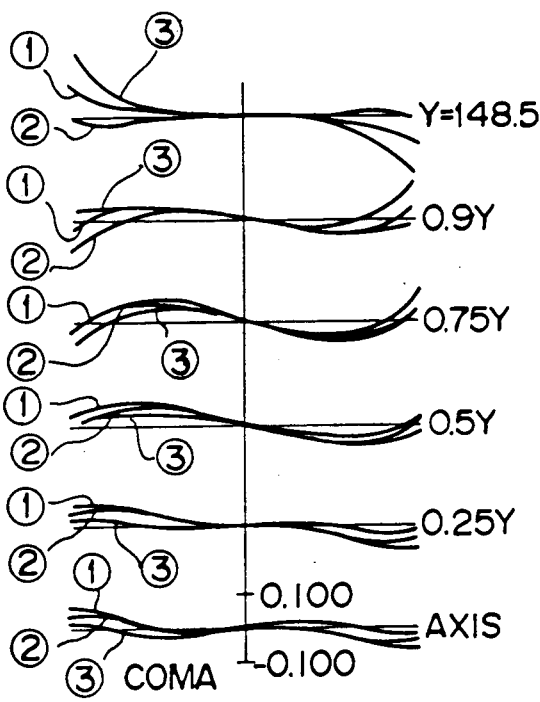
FIG. 13b is a diagram showing comatic aberration at the time of equal magnification in size of the image.
Figure 13C:
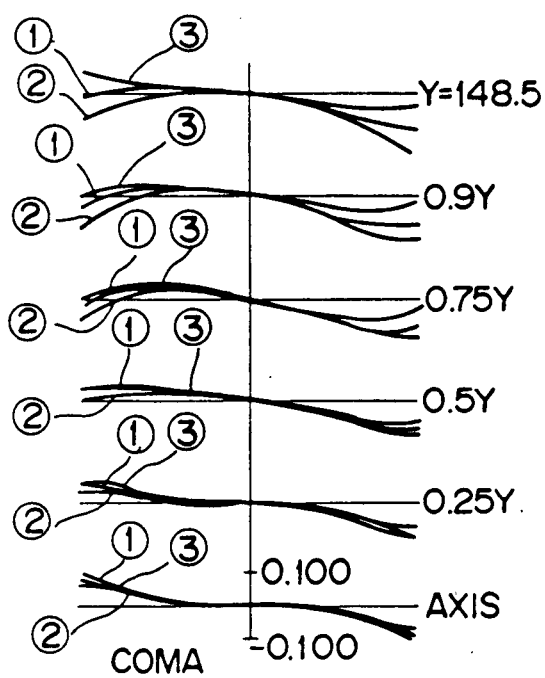
FIG. 13c is a diagram showing comatic aberration at the time of reduction in size of the image.

Similarly, FIGS. 13a to 13c respectively show comatic aberration corresponding to the above lens constructions at the times of enlargement, equal magnification and reduction in size.

A zoom lens in a fifth embodiment of the present invention will next be described with reference to FIGS. 14a to 14c, 15a1 to 15a3, 15b1 to 15b3, 15c1 to 15c3, and 16a to 16c respectively showing lens construction, aberration, etc. at the times of enlargement, equal magnification and reduction in size. In the zoom lens in this embodiment, the above-mentioned values such as radius of curvature, etc. with respect to the first to sixth lenses L1 to L6 are provided as shown in the following Table 9.

TABLE 9

| face No. | radius of curvature ri | | distance on optical axis di | | refractive index Ni | | Abbe number vi | |
|---|---|---|---|---|---|---|---|---|
| 1 | r1 | −57.532 | | | | | | |
| | | | d1 | 3.000 | N1 | 1.56339 | v1 | 42.84 |
| 2 | r2 | −655.321 | | | | | | |
| | | | d2 | variable | — | — | — | — |
| 3 | r3 | 226.534 | | | | | | |
| | | | d3 | 8.714 | N2 | 1.72000 | v2 | 50.34 |
| 4 | r4 | −67.409 | | | | | | |
| | | | d4 | variable | — | — | — | — |
| 5 | r5 | −47.193 | | | | | | |
| | | | d5 | 8.175 | N3 | 1.76182 | v3 | 26.55 |
| 6 | r6 | −61.452 | | | | | | |
| | | | d6 | variable | — | — | — | — |
| 7 | r7 | ∞ (diaphragm) | | | | | | |
| | | | d7 | variable | — | — | — | — |
| 8 | r8 | 61.452 | | | | | | |
| | | | d8 | 8.175 | N4 | 1.76182 | v4 | 26.55 |
| 9 | r9 | 47.193 | | | | | | |
| | | | d9 | variable | — | — | — | — |
| 10 | r10 | 67.409 | | | | | | |
| | | | d10 | 8.714 | N5 | 1.72000 | v5 | 50.34 |
| 11 | r11 | −226.534 | | | | | | |
| | | | d11 | variable | — | — | — | — |
| 12 | r12 | 655.321 | | | | | | |
| | | | d12 | 3.000 | N6 | 1.56339 | v6 | 42.84 |
| 13 | r13 | 57.532 | | | | | | |

The distances d2, d4, d6, d7, d9 and d11 on the optical axis with respect to the first to sixth lenses L1 to L6 set as shown in the Table 9 are changed in accordance with each magnification as shown in the following Table 10.

TABLE 10

| magnification m | 1.414 | 1.0 | 0.707 |
|---|---|---|---|
| combined focal distance f | 194 | 200 (f0) | 194 |
| distance d2 | 1.160 | 0.500 | 1.160 |
| distance d4 | 12.315 | 12.976 | 12.315 |
| distance d6 | 0.3 | 0.624 | 0.3 |
| distance d7 | 0.3 | 0.624 | 0.3 |
| distance d9 | 12.315 | 12.976 | 12.315 |
| distance d11 | 1.160 | 0.500 | 1.160 |
| F No. | 6.9 | 7.0 | 6.9 |
| height of object Y | 105.0 | 148.5 | 148.5 |
| half angle of view ω | 17.6° | 20.4° | 17.6° |

Figure 14A:
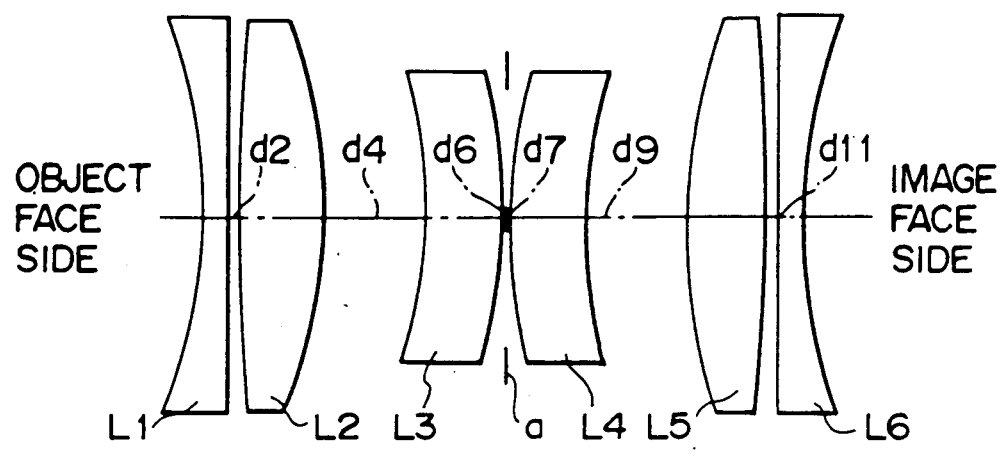
FIG. 14a is a view showing the construction of the zoom lens at the time of enlargement in size of an image.
Figure 14B:
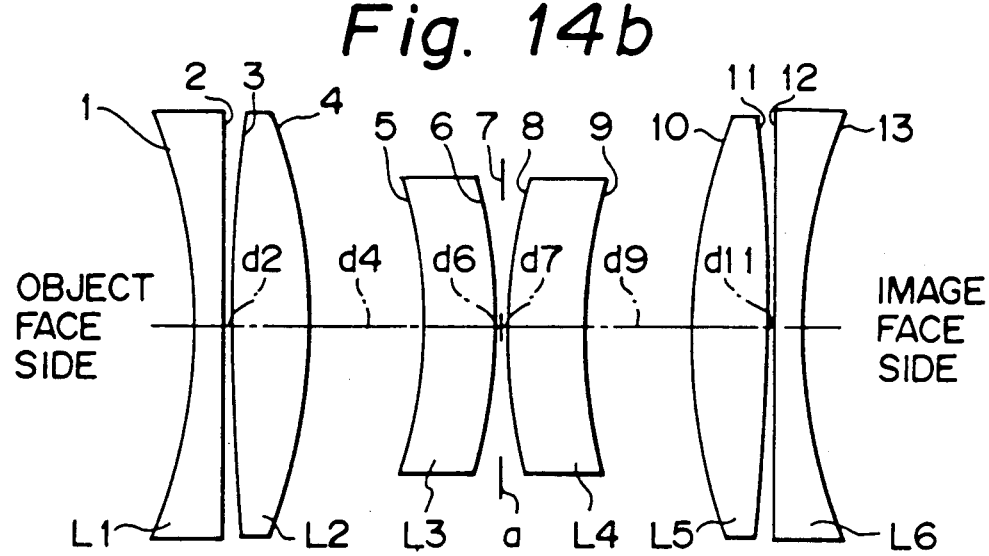
FIG. 14b is a view showing the construction of the zoom lens at the time of equal magnification in size of the image.
Figure 14C:
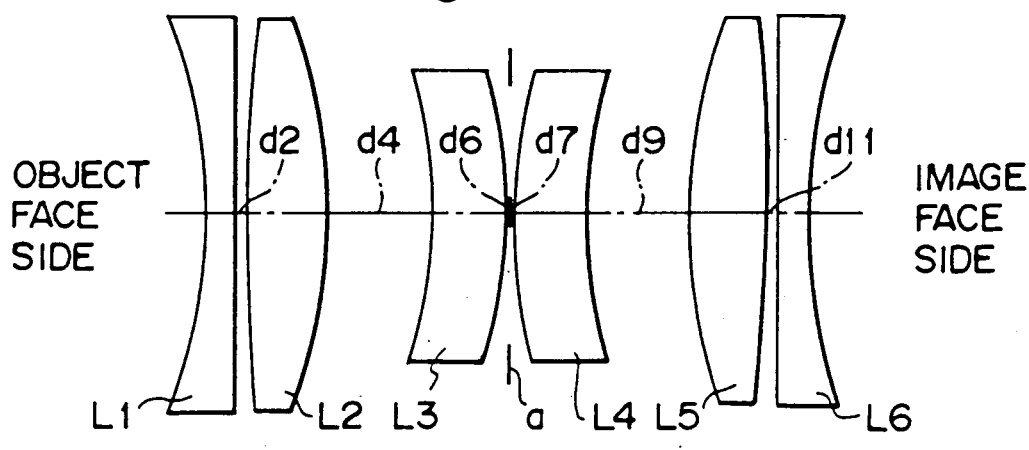
FIG. 14c is a view showing the construction of the zoom lens at the time of reduction in size of the image.

FIG. 14a shows the construction of the zoom lens formed by the first to sixth lenses L1 to L6, etc. set as shown in the Tables 9 and 10 at the time of enlargement (m=1.414) in size. FIG. 14b shows the construction of the zoom lens at the time of equal magnification (m=1.0). FIG. 14c shows the construction of the zoom lens at the time of reduction (m=0.707) in size.

In this fifth embodiment, similar to the above-mentioned embodiments, it is possible to provide a zoom lens for a variable magnification copying machine in which the magnification is continuously changed while the conjugate length from an object face to an image face is constantly held at the times of equal and variable magnifications.

FIGS. 15a1, 15b1 and 15c1 respectively show spherical aberration corresponding to the lens constructions as above at the times of enlargement, equal magnification and reduction in size shown in FIGS. 14a, 14b and 14c. FIGS. 15a2, 15b2 and 15c2 show astigmatism corresponding to the above lens constructions. FIGS. 15a3, 15b3 and 15c3 show distortion aberration corresponding to the above lens constructions.

Similarly, FIGS. 16a to 16c respectively show comatic aberration corresponding to the above lens constructions at the times of enlargement, equal magnification and reduction in size.

A zoom lens in a sixth embodiment of the present invention will next be described with reference to FIGS. 17a to 17c, 18a1 to 18a3, 18b1 to 18b3, 18c1 to 18c3, and 19a to 19c respectively showing lens construction, aberration, etc. at the times of enlargement, equal magnification and reduction in size. In the zoom lens in this embodiment, the above-mentioned values such as radius of curvature, etc. with respect to the first to sixth lenses L1 to L6 are provided as shown in the following Table 11.

TABLE 11

| face No. | radius of curvature ri | | distance on optical axis di | | refractive index Ni | | Abbe number vi | |
|---|---|---|---|---|---|---|---|---|
| 1 | r1 | −57.840 | | | | | | |
| | | | d1 | 3.000 | N1 | 1.56339 | v1 | 42.84 |
| 2 | r2 | −678.180 | | | | | | |
| | | | d2 | variable | — | — | — | — |
| 3 | r3 | 217.415 | | | | | | |
| | | | d3 | 8.942 | N2 | 1.72000 | v2 | 50.34 |
| 4 | r4 | −68.283 | | | | | | |
| | | | d4 | variable | — | — | — | — |
| 5 | r5 | −47.112 | | | | | | |
| | | | d5 | 7.995 | N3 | 1.76182 | v3 | 26.55 |
| 6 | r6 | −61.326 | | | | | | |
| | | | d6 | variable | — | — | — | — |
| 7 | r7 | ∞ (diaphragm) | | | | | | |
| | | | d7 | variable | — | — | — | — |
| 8 | r8 | 61.326 | | | | | | |
| | | | d8 | 7.995 | N4 | 1.76182 | v4 | 26.55 |
| 9 | r9 | 47.112 | | | | | | |
| | | | d9 | variable | — | — | — | — |
| 10 | r10 | 68.283 | | | | | | |
| | | | d10 | 8.942 | N5 | 1.72000 | v5 | 50.34 |
| 11 | r11 | −217.415 | | | | | | |
| | | | d11 | variable | — | — | — | — |
| 12 | r12 | 678.180 | | | | | | |
| | | | d12 | 3.000 | N6 | 1.56339 | v6 | 42.84 |
| 13 | r13 | 57.840 | | | | | | |

The distances d2, d4, d6, d7, d9 and d11 on the optical axis in the above Table 11 have values different from each other at the times of equal and variable magnifications. In other words, the second to fifth lenses L2 to L5 are moved as shown in the following Table 12.

TABLE 12

| magnification m | 1.414 | 1.0 | 0.707 |
|---|---|---|---|
| combined focal distance f | 194 | 200 (f0) | 194 |
| distance d2 | 1.195 | 0.500 | 1.195 |
| distance d4 | 13.163 | 13.462 | 13.163 |
| distance d6 | 0.599 | 0.300 | 0.599 |
| distance d7 | 0.599 | 0.300 | 0.599 |
| distance d9 | 13.163 | 13.462 | 13.163 |
| distance d11 | 1.195 | 0.500 | 1.195 |
| F No. | 6.8 | 7.0 | 6.8 |
| height of object Y | 105.0 | 148.5 | 148.5 |
| half angle of view ω | 17.6° | 20.4° | 17.6° |

Figure 17A:
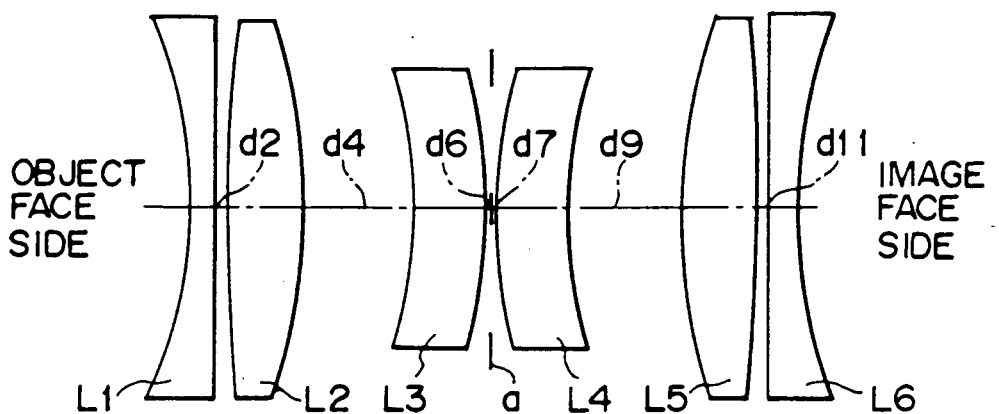
FIG. 17a is a view showing the construction of the zoom lens at the time of enlargement in size of an image.
Figure 17B:
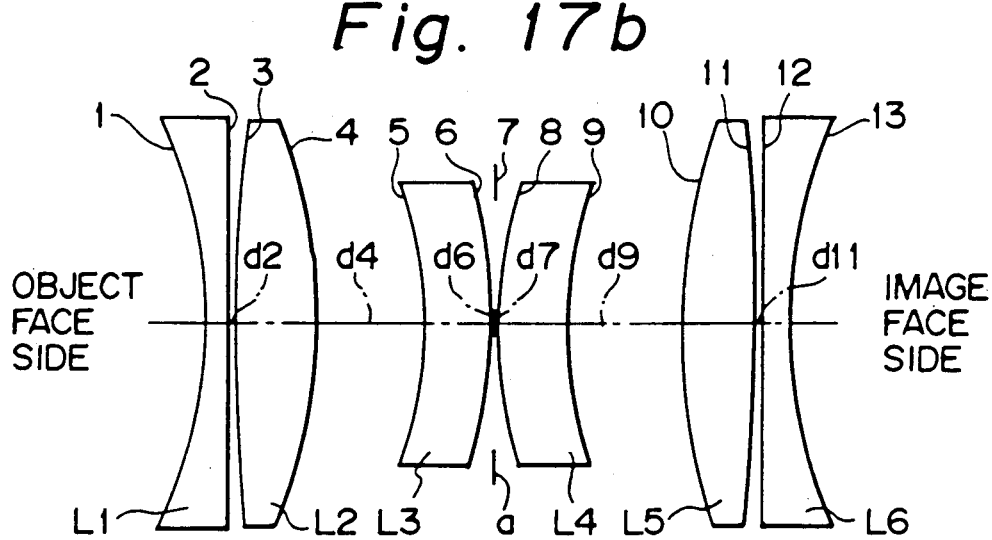
FIG. 17b is a view showing the construction of the zoom lens at the time of equal magnification in size of the image.
Figure 17C:
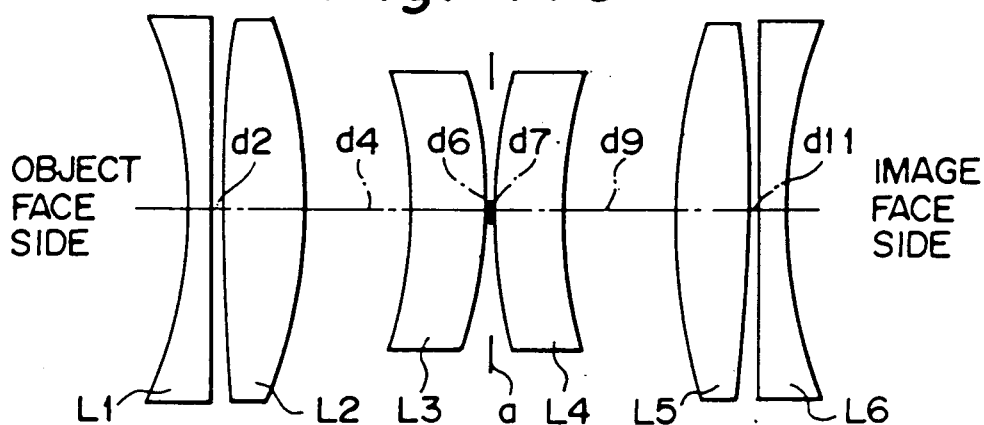
FIG. 17c is a view showing the construction of the zoom lens at the time of reduction in size of the image.

FIG. 17a shows the construction of the zoom lens formed by the first to sixth lenses L1 to L6, etc. set as shown in the Tables 11 and 12 at the time of enlargement (m=1.414) in size. FIG. 17b shows the construction of the zoom lens at the time of equal magnification (m=1.0). FIG. 17c shows the construction of the zoom lens at the time of reduction (m=0.707) in size.

In this sixth embodiment, similar to the above-mentioned embodiments, it is possible to provide a zoom lens for a variable magnification copying machine in which the magnification is continuously changed while the conjugate length from an object face to an image face is constantly held at the times of equal and variable magnifications.

FIGS. 18a1, 18b1 and 18c1 respectively show spherical aberration corresponding to the lens constructions as above at the times of enlargement, equal magnification and reduction in size shown in FIGS. 17a, 17b and 17c. FIGS. 18a2, 18b2 and 18c2 show astigmatism corresponding to the above lens constructions. FIGS. 18a3, 18b3 and 18c3 show distortion aberration corresponding to the above lens constructions.

Figure 19A:
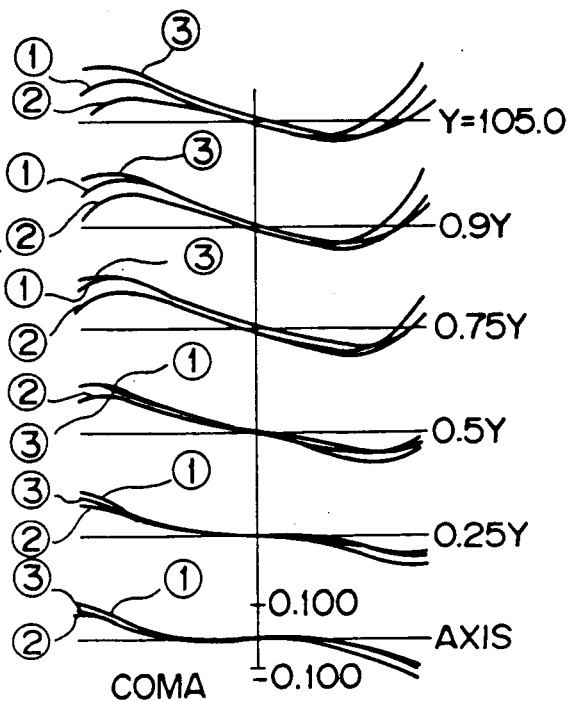
FIG. 19a is a diagram showing comatic aberration at the time of enlargement in size of the image.
Figure 19B:
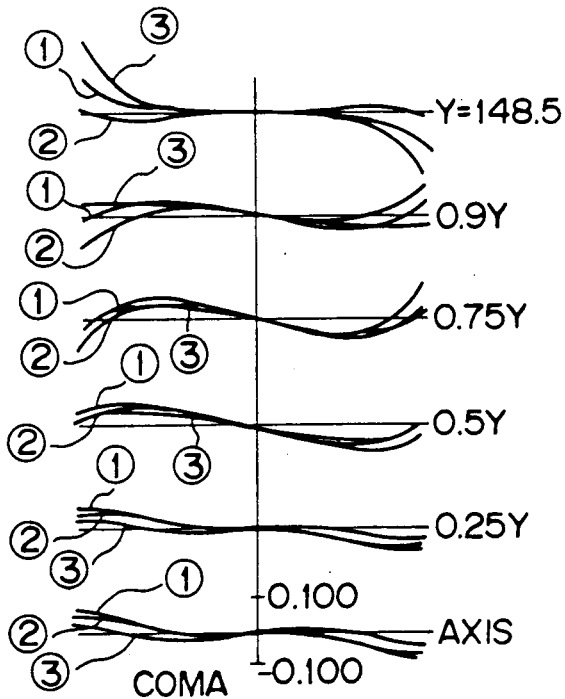
FIG. 19b is a diagram showing comatic aberration at the time of equal magnification in size of the image.
Figure 19C:
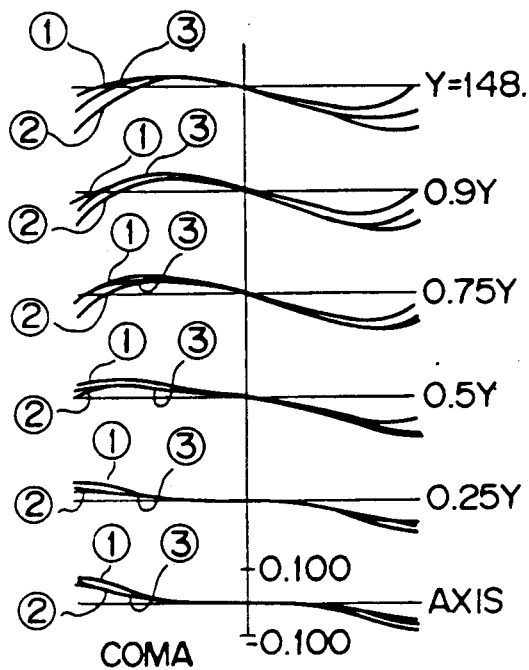
FIG. 19c is a diagram showing comatic aberration at the time of reduction in size of the image.

Similarly, FIGS. 19a to 19c respectively show comatic aberration corresponding to the above lens constructions at the times of enlargement, equal magnification and reduction in size.

A zoom lens in a seventh embodiment of the present invention will next be described with reference to FIGS. 20a to 20c, 21a1 to 21a3, 21b1 to 21b3, 21c1 to 21c3, and 22a to 22c respectively showing lens construction, aberration, etc. at the times of enlargement, equal magnification and reduction in size. In the zoom lens in this embodiment, the above-mentioned values such as radius of curvature, etc. with respect to the first to sixth lenses L1 to L6 are provided as shown in the following Table 13.

TABLE 13

| face No. | radius of curvature ri | | distance on optical axis di | refractive index Ni | Abbe number νi |
|---|---|---|---|---|---|
| 1 | r1 | −57.915 | | | |
| | | | d1 3.000 | N1 1.56339 | ν1 42.84 |
| 2 | r2 | −682.140 | | | |
| | | | d2 variable | — | — |
| 3 | r3 | 217.070 | | | |
| | | | d3 8.942 | N2 1.72000 | ν2 50.34 |
| 4 | r4 | −68.315 | | | |
| | | | d4 variable | — | — |
| 5 | r5 | −47.161 | | | |
| | | | d5 8.073 | N3 1.76182 | ν3 26.55 |
| 6 | r6 | −61.464 | | | |
| | | | d6 0.300 | — | — |
| 7 | r7 | ∞ (diaphragm) | | | |

TABLE 13-continued

| face No. | radius of curvature ri | distance on optical axis di | refractive index Ni | Abbe number νi |
|---|---|---|---|---|
| | | d7 0.300 | — | — |
| 8 | r8 61.464 | | | |
| | | d8 8.073 | N4 1.76182 | ν4 26.55 |
| 9 | r9 47.161 | | | |
| | | d9 variable | — | — |
| 10 | r10 68.315 | | | |
| | | d10 8.942 | N5 1.72000 | ν5 50.34 |
| 11 | r11 −217.070 | | | |
| | | d11 variable | — | — |
| 12 | r12 682.140 | | | |
| | | d12 3.000 | N6 1.56339 | ν6 42.84 |
| 13 | r13 57.915 | | | |

The distances d2, d4, d9 and d11 on the optical axis with respect to the first to sixth lenses L1 to L6 set as shown in the Table 13 are changed in accordance with each magnification as shown in the following Table 14.

TABLE 14

| magnification m | 1.414 | 1.0 | 0.707 |
|---|---|---|---|
| combined focal distance f | 194 | 200 (f0) | 194 |
| distance d2 | 1.181 | 0.500 | 1.181 |
| distance d4 | 12.986 | 13.431 | 12.986 |
| distance d9 | 12.986 | 13.431 | 12.986 |
| distance d11 | 1.181 | 0.500 | 1.181 |
| F No. | 6.9 | 7.0 | 6.9 |
| height of object Y | 105.0 | 148.5 | 148.5 |
| half angle of view ω | 17.6° | 20.4° | 17.6° |

Figure 20A:
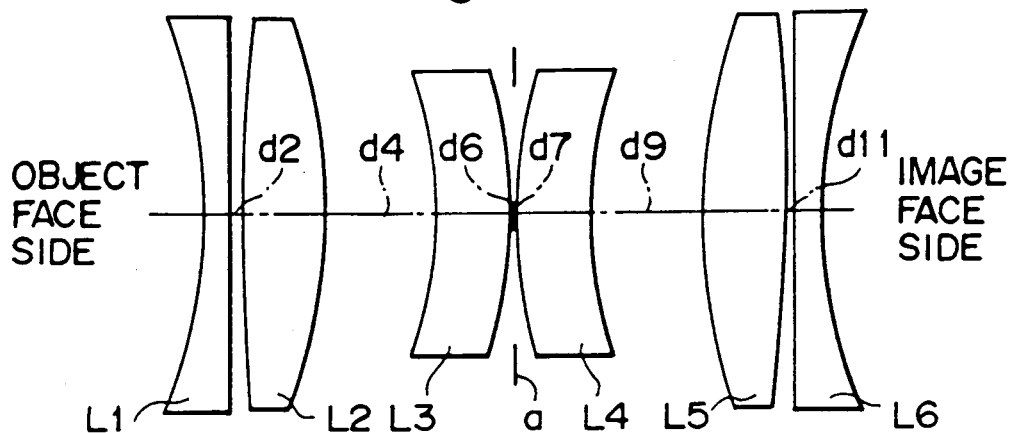
FIG. 20a is a view showing the construction of the zoom lens at the time of enlargement in size of an image.
Figure 20B:
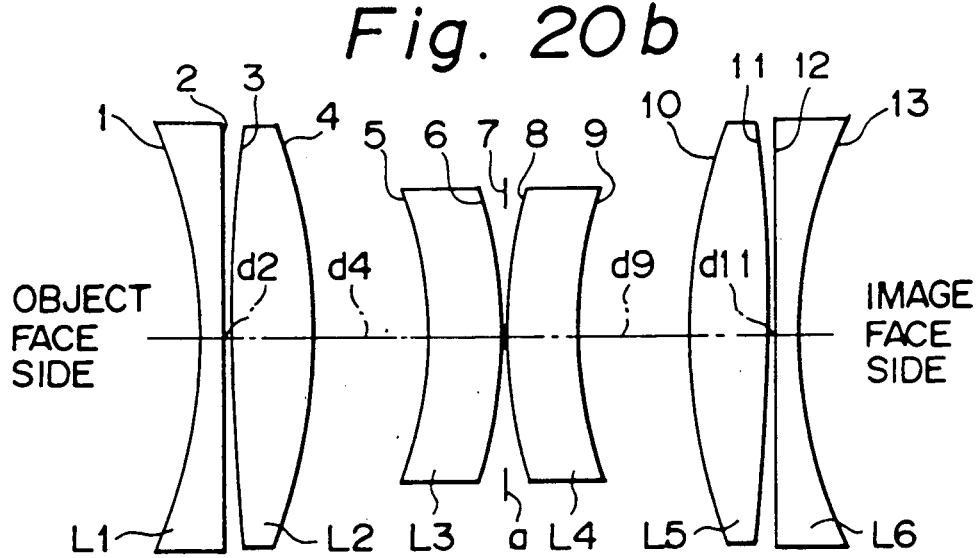
FIG. 20b is a view showing the construction of the zoom lens at the time of equal magnification in size of the image.
Figure 20C:
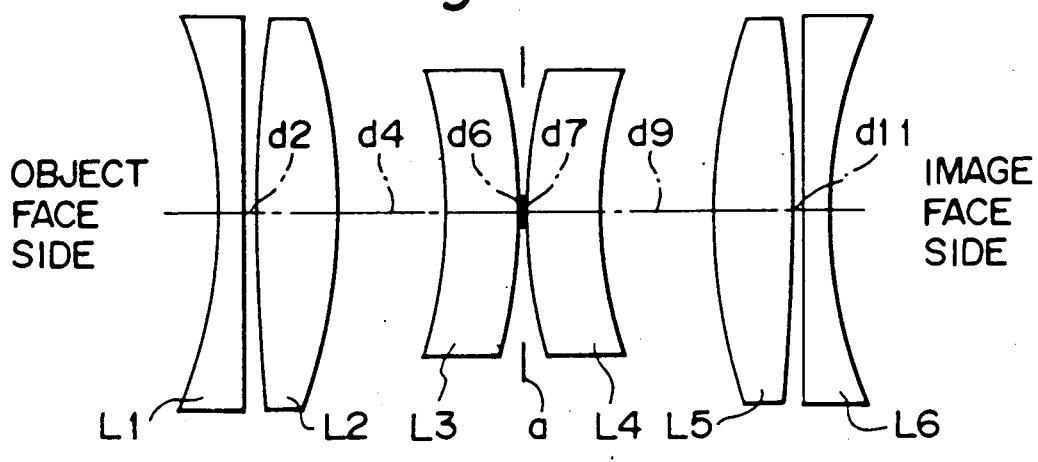
FIG. 20c is a view showing the construction of the zoom lens at the time of reduction in size of the image.

FIG. 20a shows the construction of the zoom lens formed by the first to sixth lenses L1 to L6, etc. set as shown in the Tables 13 and 14 at the time of enlargement (m=1.414) in size. FIG. 20b shows the construction of the zoom lens at the time of equal magnification (m=1.0). FIG. 20c shows the construction of the zoom lens at the time of reduction (m=0.707) in size.

In this seventh embodiment, similar to the above-mentioned embodiments, it is possible to provide a zoom lens for a variable magnification copying machine in which the magnification is continuously changed while the conjugate length from an object face to an image face is constantly held at the times of equal and variable magnifications.

FIGS. 21a1, 21b1 and 21c1 respectively show spherical aberration corresponding to the lens constructions as above at the times of enlargement, equal magnification and reduction in size shown in FIGS. 20a, 20b and 20c. FIGS. 21a2, 21b2 and 21c2 show astigmatism corresponding to the above lens constructions. FIGS. 21a3, 21b3 and 21c3 show distortion aberration corresponding to the above lens constructions.

Figure 22A:
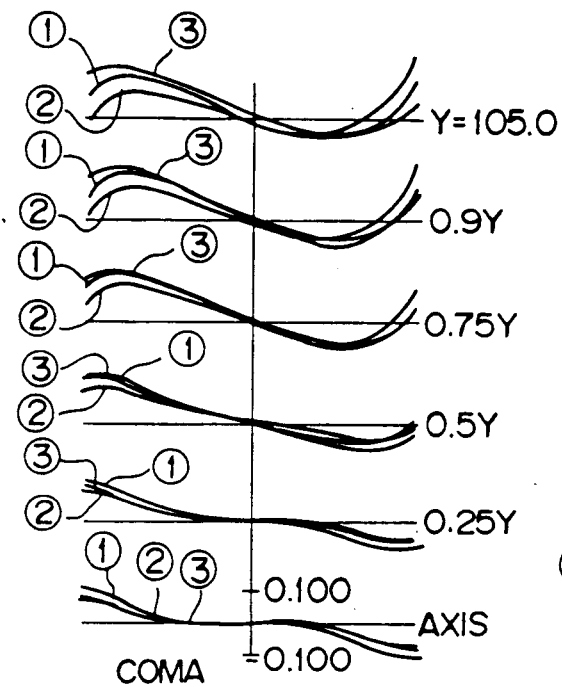
FIG. 22a is a diagram showing comatic aberration at the time of enlargement in size of the image.
Figure 22B:
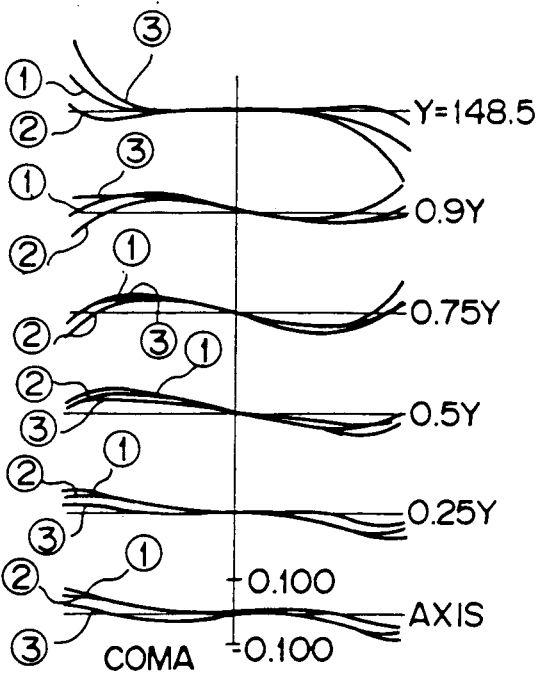
FIG. 22b is a diagram showing comatic aberration at the time of equal magnification in size of the image.
Figure 22C:
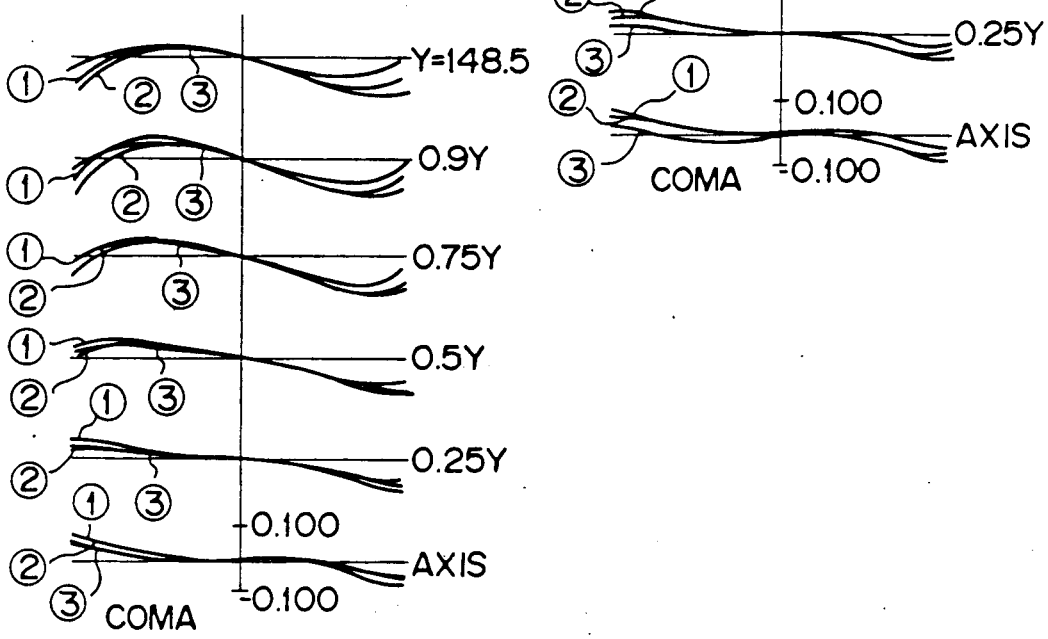
FIG. 22c is a diagram showing comatic aberration at the time of reduction in size of the image.

Similarly, FIGS. 22a to 22c respectively show comatic aberration corresponding to the above lens constructions at the times of enlargement, equal magnification and reduction in size.

A zoom lens in an eighth embodiment of the present invention will next be described with reference to FIGS. 23a to 23c, 24a1 to 24a3, 24b1 to 24b3, 24c1 to 24c3, and 25a to 25c respectively showing lens construction, aberration, etc. at the times of enlargement, equal magnification and reduction in size. In the zoom lens in this embodiment, the above-mentioned values such as radius of curvature, etc. with respect to the first to sixth lenses L1 to L6 are provided as shown in the following Table 15.

TABLE 15

| face No. | radius of curvature ri | | distance on optical axis di | | refractive index Ni | | Abbe number νi | |
|---|---|---|---|---|---|---|---|---|
| 1 | r1 | −63.617 | | | | | | |
| | | | d1 | 3.000 | N1 | 1.56339 | ν1 | 42.84 |
| 2 | r2 | 470.846 | | | | | | |
| | | | d2 | variable | — | — | — | — |
| 3 | r3 | 193.193 | | | | | | |
| | | | d3 | 9.219 | N2 | 1.72000 | ν2 | 50.34 |
| 4 | r4 | −79.702 | | | | | | |
| | | | d4 | variable | — | — | — | — |
| 5 | r5 | −51.095 | | | | | | |
| | | | d5 | 7.198 | N3 | 1.76182 | ν3 | 26.55 |
| 6 | r6 | −68.187 | | | | | | |
| | | | d6 | variable | — | — | — | — |
| 7 | r7 | ∞ (diaphragm) | | | | | | |
| | | | d7 | variable | — | — | — | — |
| 8 | r8 | 68.187 | | | | | | |
| | | | d8 | 7.198 | N4 | 1.76182 | ν4 | 26.55 |
| 9 | r9 | 51.095 | | | | | | |
| | | | d9 | variable | — | — | — | — |
| 10 | r10 | 79.702 | | | | | | |
| | | | d10 | 9.219 | N5 | 1.72000 | ν5 | 50.34 |
| 11 | r11 | −193.193 | | | | | | |
| | | | d11 | variable | — | — | — | — |
| 12 | r12 | −470.846 | | | | | | |
| | | | d12 | 3.000 | N6 | 1.56339 | ν6 | 42.84 |
| 13 | r13 | 63.617 | | | | | | |

The distances d2, d4, d6, d7, d9 and d11 on the optical axis in the above Table 15 have values different from each other at the times of equal and variable magnifications. In other words, the first to sixth lenses L1 to L6 are moved as shown in the following Table 16.

TABLE 16

| magnification m | 1.414 | 1.0 | 0.707 |
|---|---|---|---|
| combined focal distance f | 194 | 200 (f0) | 194 |
| distance d2 | 3.456 | 2.468 | 3.456 |
| distance d4 | 17.193 | 16.724 | 17.193 |
| distance d6 | 2.506 | 0.922 | 2.506 |
| distance d7 | 2.506 | 0.922 | 2.506 |
| distance d9 | 17.193 | 16.724 | 17.193 |
| distance d11 | 3.456 | 2.468 | 3.456 |
| F No. | 6.8 | 7.0 | 6.8 |
| height of object Y | 105.0 | 148.5 | 148.5 |
| half angle of view ω | 17.6° | 20.4° | 17.6° |

Figure 23A:
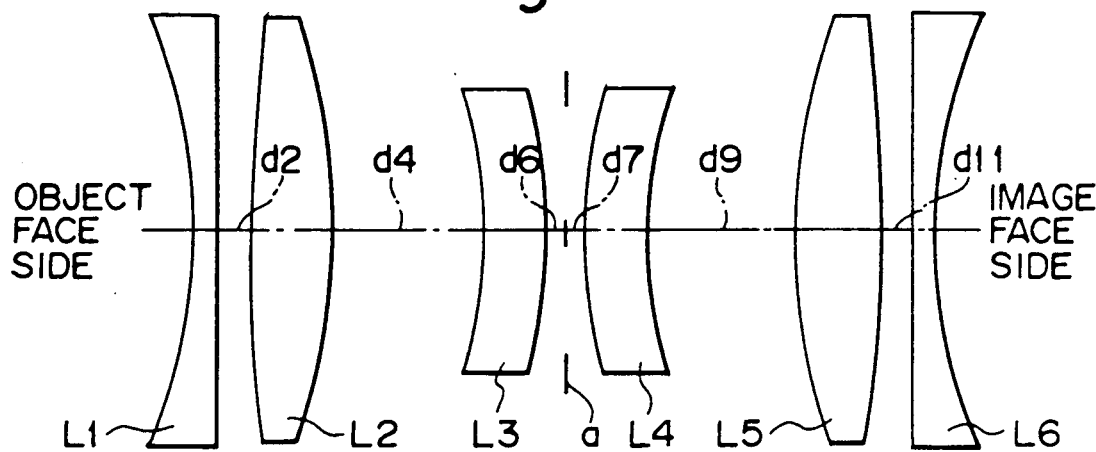
FIG. 23a is a view showing the construction of the zoom lens at the time of enlargement in size of an image.
Figure 23B:
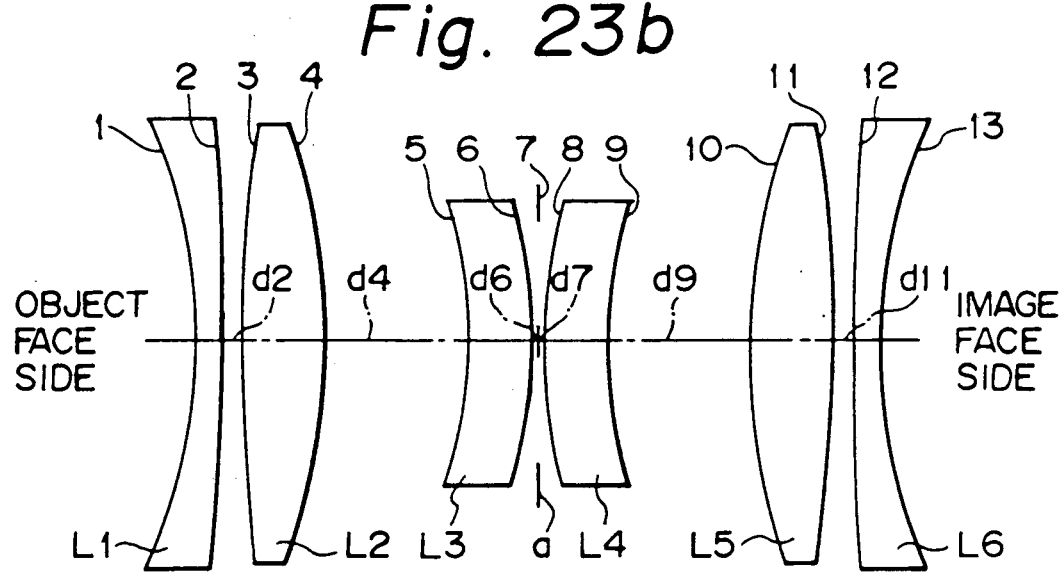
FIG. 23b is a view showing the construction of the zoom lens at the time of equal magnification in size of the image.
Figure 23C:
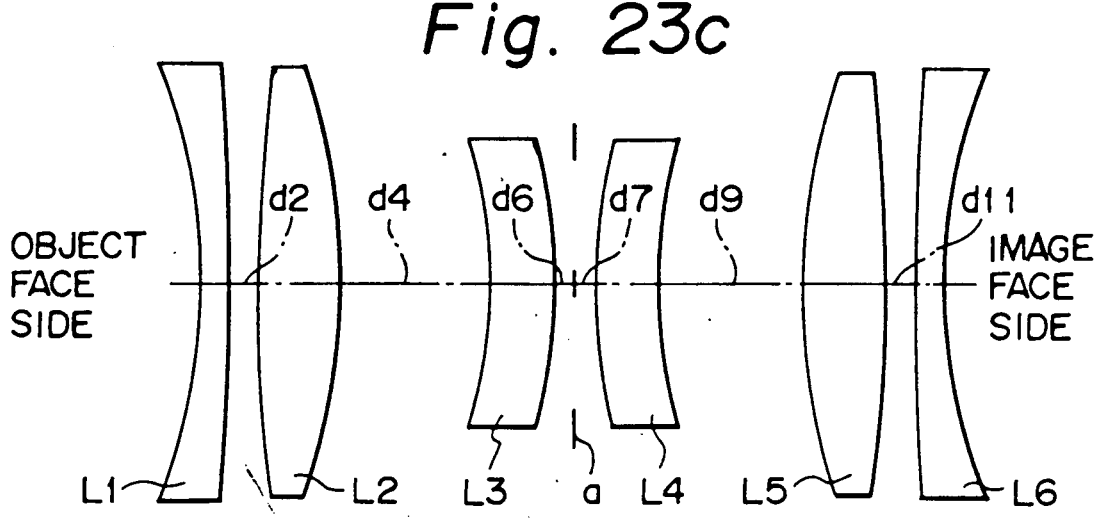
FIG. 23c is a view showing the construction of the zoom lens at the time of reduction in size of the image.

FIG. 23a shows the construction of the zoom lens formed by the first to sixth lenses L1 to L6, etc. set as shown in the Tables 15 and 16 at the time of enlargement (m=1.414) in size. FIG. 23b shows the construction of the zoom lens at the time of equal magnification (m=1.0). FIG. 23c shows the construction of the zoom lens at the time of reduction (m=0.707) in size.

In this eighth embodiment, similar to the above-mentioned embodiments, it is possible to provide a zoom lens for a variable magnification copying machine in which the magnification is continuously changed while the conjugate length from an object face to an image face is constantly held at the times of equal and variable magnifications.

FIGS. 24a1, 24b1 and 24c1 respectively show spherical aberration corresponding to the lens constructions as above at the times of enlargement, equal magnification and reduction in size shown in FIGS. 23a, 23b and 23c. FIGS. 24a2, 24b2 and 24c2 show astigmatism corresponding to the above lens constructions. FIGS. 24a3, 24b3 and 24c3 show distortion aberration corresponding to the above lens constructions.

Figure 25A:
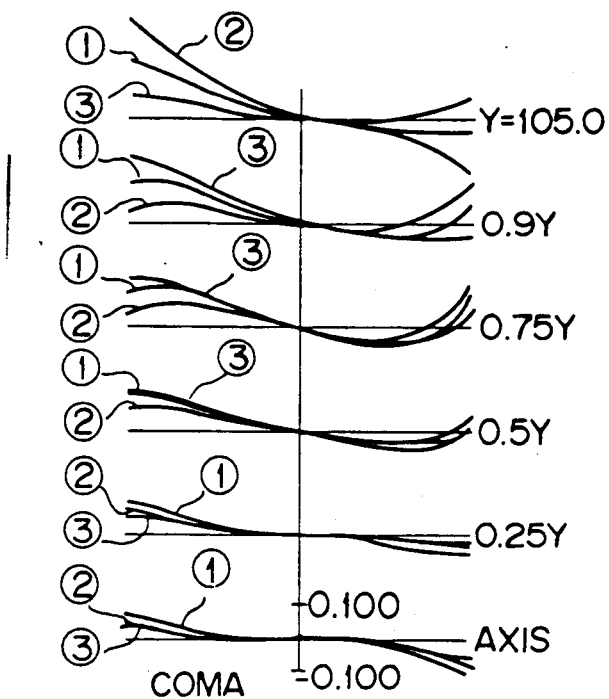
FIG. 25a is a diagram showing comatic aberration at the time of enlargement in size of the image.
Figure 25B:
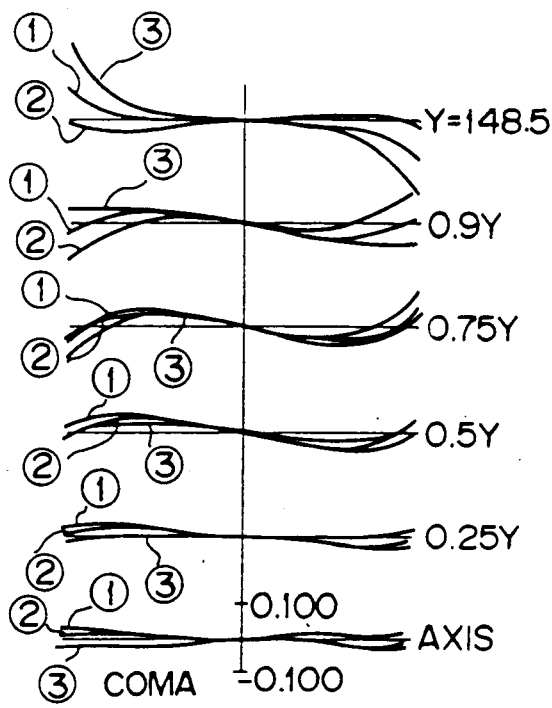
FIG. 25b is a diagram showing comatic aberration at the time of equal magnification in size of the image.
Figure 25C:
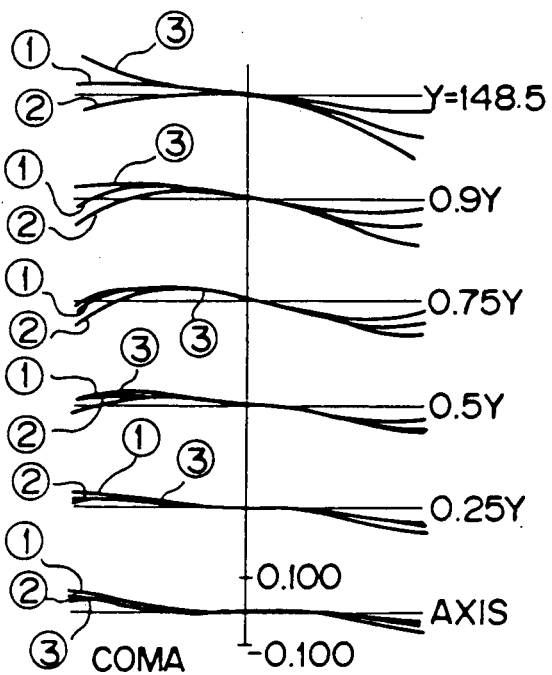
FIG. 25c is a diagram showing comatic aberration at the time of reduction in size of the image.

Similarly, FIGS. 25a to 25c respectively show comatic aberration corresponding to the above lens constructions at the times of enlargement, equal magnification and reduction in size.

In the above first to eighth embodiments, the above-mentioned conditions, $0.35 < |f1/f0| < 0.7$ and
$0.25 < f2/f0 < 0.45$ are set to be satisfied. These values $|f1/f0|$ and $f2/f0$ are shown in the following Table 17.

TABLE 17

| | focal distance f1, f6 | focal distance f2, f5 | $|f1/f0|$ | f2/f0 |
|---|---|---|---|---|
| first embodiment | −80.001 | 62.955 | 0.400 | 0.315 |
| second embodiment | −99.995 | 71.340 | 0.500 | 0.369 |
| third embodiment | −110.262 | 73.808 | 0.551 | 0.369 |
| fourth embodiment | −111.341 | 73.123 | 0.557 | 0.366 |
| fifth embodiment | −111.372 | 73.060 | 0.557 | 0.365 |
| sixth embodiment | −111.654 | 73.129 | 0.558 | 0.366 |
| seventh embodiment | −111.751 | 73.129 | 0.559 | 0.366 |
| eighth embodiment | −130.001 | 79.491 | 0.650 | 0.397 |

(f0 = 200)

As shown in the above Table 17, it should be understood that the above conditions are satisfied in all the embodiments.

As can be seen from the aberration diagrams respectively showing the first to eighth embodiments, the aberration on the optical axis and the aberration outside the optical axis are balanced very well at each magnification in any one of the embodiments. Further, it should be understood that a flare component is very small and comatic aberration are preferably corrected although vignetting factor is approximately 100%.

As mentioned above, in a zoom lens for a variable magnification copying machine in accordance with the present invention, although the zoom lens is constructed by six lens groups and therefore the number of lenses is small, various aberrations are preferably corrected at a magnification in a very wide range from 0.707 to 1.414 times by symmetrically moving at least first and six lenses. Further, a very high contrast can be provided at any magnification and the zoom lens can be made compact.

Further, in accordance with the present invention, the variable magnification in a wide range can be obtained as above while the conjugate length from an object face to an image face is constantly held. Therefore, it is not necessary to dispose a mechanism for moving a reflection mirror, etc. in association with the movement of the zoom lens. Further, the lenses on the front and rear sides of the zoom lens with respect to a diaphragm are symmetrically moved to perform the zooming operation. Accordingly, the construction of the mechanism for performing the zooming operation is simplified so that it is possible to provide a variable magnification copying machine having a very simplified construction.

Moreover, in accordance with the present invention, the six lens groups in the zoom lens are constructed by three pairs of equal lenses so that the zoom lens is advantageously manufactured and it is also advantageous in manufacture control. Accordingly, it is possible to provide a zoom lens for a variable magnification copying machine cheaply manufactured.

Many widely different embodiments of the present invention may be constructed without departing from the spirit and scope of the present invention. It should be understood that the present invention is not limited to the specific embodiments described in the specification, except as defined in the appended claims.

What is claimed is:

1. A zoom lens for a variable magnification copying machine comprising:
   a first lens composed of a concave lens;
   a second lens composed of a convex lens;
   a third lens composed of a meniscus concave lens and having a concave face on an object side;
   a diaphragm;
   a fourth lens composed of the same lens as said third lens and having a concave face on an image face side;
   a fifth lens composed of the same convex lens as said second lens;
   a sixth lens composed of the same concave lens as said first lens;
   said first to sixth group lenses being sequentially arranged from an object face toward an image face;
   said first to sixth lenses being symmetrically arranged around said diaphragm when an object is formed as an image on the image face at equal magnification; and
   means for symmetrically moving at least the first and sixth lenses among the first to sixth lenses and the diaphragm and for moving the entire lens system in the direction of an optical axis when the object is formed by changing the magnification as an image on the image face so as to continuously change the magnification while a conjugate length from the object face to the image face is constantly held at the times of equal and variable magnifications;
   wherein, when the focal distances of said first and second lenses are respectively set to f1 and f2 and a combined focal distance of the entire lens system at the time of the equal magnification is set to f0, the following conditions
   $0.35 < |f1/f0| < 0.7$ and $0.25 < f2/f0 < 0.45$ are satisfied.

2. A zoom lens for a variable magnification copying machine comprising:
   a first lens composed of a concave lens;
   a second lens composed of a convex lens;
   a third lens composed of a meniscus concave lens and having a concave face on an object side;
   a diaphragm;
   a fourth lens composed of the same lens as said third lens and having a concave face on an image face side;
   a fifth lens composed of the same concave lens as said second lens;
   a sixth lens composed of the same concave lens as said first lens;
   said first to sixth group lenses being sequentially arranged from an object face toward the image face;
   said first to sixth lenses being symmetrically arranged around said diaphragm when an object is formed as an image on the image face at equal magnification; and
   means for symmetrically moving at least the first and sixth lenses among the first to sixth lenses and the diaphragm and for moving the entire lens system in the direction of an optical axis when the object is formed by changing the magnification as an image on the image face so as to continuously change the magnification while a conjugate length from the object face to the image face is constantly held at the times of equal and variable magnifications;
   wherein the second, third, fourth and fifth lenses have a function for mainly correcting aberration as a master lens;
   wherein the first and sixth lenses are additionally disposed outside said master lens and have a function for effectively reducing the moving amounts of the lenses to change the focal distance thereof at the time of the variable magnification; and
   wherein, when the magnification is changed, the first and sixth lenses and a portion or all of said master lens are moved to change the focal distances thereof.

3. A zoom lens for a variable power copying apparatus comprising six lenses disposed in the following order from an object surface to an image surface, which include:
   a first lens composed of a negative lens with the orientation of a concave surface thereof towards an object;
   a second lens composed of a positive lens;
   a third lens composed of a negative lens with the orientation of concave surface towards the object;
   a diaphragm;
   a fourth lens having a structure the same as the third lens with the orientation of a concave surface thereof towards an image of the object;
   a fifth lens having a structure the same as the second lens; and
   a sixth lens having a structure the same as the first lens with the orientation of a concave surface thereof towards the image;
   wherein, at the time of forming a natural size scale image of the object, the first to sixth lenses are arranged symmetrically with respect to the diaphragm; and
   wherein, at the time of forming a reduced or magnified size scale image of the object, the first to sixth lenses and the diaphragm are arranged so that each of the first to sixth lenses are moved symmetrically with respect to the diaphragm as one of five or six group lenses, and a length of the entire lens system is moved along an optical axis so that the image size is continuously varied maintaining both a conjugate length between the object surface and the image surface.

4. A zoom lens as claimed in claim 6, wherein, when focal distances of said first and second lenses are respectively set to f1 and f2 and a combined focal distance of the entire lens system at the time of the equal magnification is set to f0, the following conditions, $0.35 < |f1/f0| < 0.7$ and $0.25 < f2/f0 < 0.45$, are satisfied.

5. A zoom lens for a variable power copying apparatus according to claim 6, wherein:
   the first lens is composed of a negative meniscus lens or a biconcave lens, the second lens is composed of a biconvex lens, the third lens is composed of a negative meniscus lens, the fourth lens is composed of a negative meniscus lens, the fifth lens is composed of a biconvex lens, and the sixth lens is composed of a negative meniscus lens or a biconcave lens.

* * * * *